United States Patent [19]
Yokota et al.

[11] Patent Number: 6,144,499
[45] Date of Patent: Nov. 7, 2000

[54] PROJECTION LENS

[75] Inventors: Akihiro Yokota; Takeshi Kobayashi, both of Sano, Japan

[73] Assignee: Sekinos Co., Ltd., Japan

[21] Appl. No.: 09/344,503

[22] Filed: Jun. 25, 1999

[30] Foreign Application Priority Data

Jul. 3, 1998 [JP] Japan .................................. 10-188803
Nov. 2, 1998 [JP] Japan .................................. 10-311828

[51] Int. Cl.$^7$ ...................................................... G02B 3/00
[52] U.S. Cl. .......................................... 359/649; 359/714
[58] Field of Search .................................. 359/649, 650, 359/651, 714

[56] References Cited

U.S. PATENT DOCUMENTS 5,329,363 7/1994 Moskovich .
5,659,424 8/1997 Osawa et al. ............................ 359/649

FOREIGN PATENT DOCUMENTS 6-49186 2/1994 Japan .

*Primary Examiner*—Scott J. Sugarman
*Attorney, Agent, or Firm*—Lorusso & Loud

[57] ABSTRACT

The present invention relates to a projection lens including: a power lens unit; one or more image-side lens units, provided on the image side with respect to the power lens, for correcting an aberration; and one or more opposite-image-side lens units, provided on the side opposite to the image side with respect to the power lens, for correcting an aberration, which projection lens has the following features. That is, the power lens unit includes a lens element made of a glass material having an Abbe number falling within a range from 50 to 75; the one or more image-side lens units include a lens element made of a plastic material having an Abbe number falling within a range from 20 to 35, and a lens element made of a plastic material having an Abbe number falling within a range from 50 to 60; and the one or more opposite-image-side lens units include a lens element made of a plastic material having an Abbe number falling within a range from 20 to 35, and a lens element made of a plastic material having an Abbe number falling within a range from 50 to 60.

5 Claims, 32 Drawing Sheets

F I G. 1
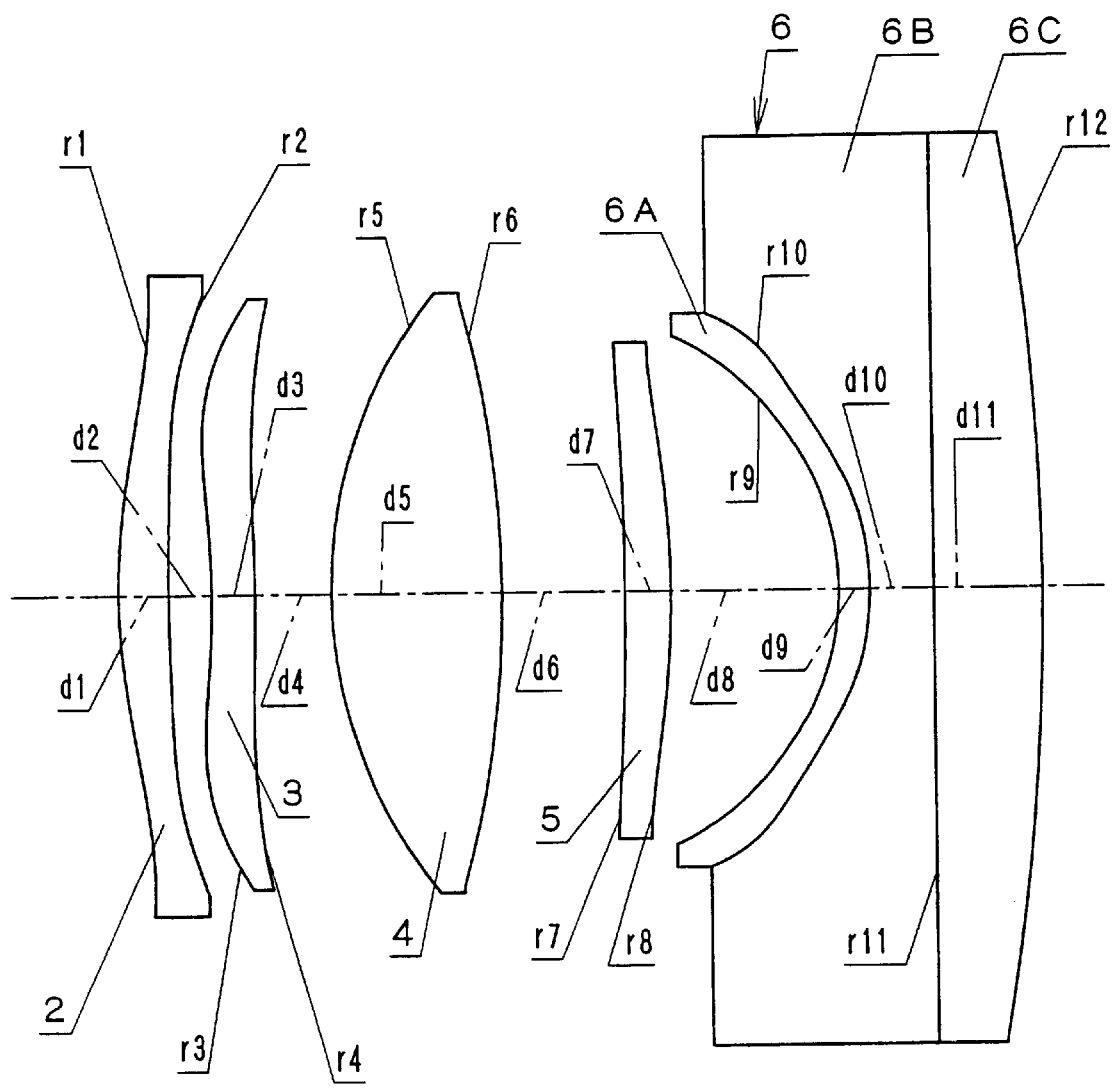

F I G. 2

| r | R [mm] | d [mm] | nd | νd |
|---|---|---|---|---|
| 1 | 73.830 | 6.50 | 1.620 | 24 |
| 2 | 195.124 | 5.68 | | |
| 3 | -104.745 | 5.79 | 1.492 | 58 |
| 4 | -191.783 | 10.00 | | |
| 5 | 63.235 | 22.40 | 1.517 | 64 |
| 6 | -148.930 | 16.22 | | |
| 7 | -304.273 | 6.00 | 1.620 | 24 |
| 8 | -107.517 | 22.00 | | |
| 9 | -36.310 | 3.98 | 1.492 | 58 |
| 10 | -40.645 | 8.40 | 1.437 | 73 |
| 11 | ∞ | 14.10 | 1.562 | 56 |
| 12 | -350.000 | | | |

F I G. 3

| r | FIRST SURFACE | SECOND SURFACE | THIRD SURFACE | FOURTH SURFACE |
|---|---|---|---|---|
| K | 0 | 0 | 0 | 0 |
| A3 | -0.119180E-3 | -0.165810E-3 | 0.131204E-3 | 0.277753E-3 |
| A4 | 0.148568E-4 | 0.214731E-4 | -0.158009E-4 | -0.431260E-4 |
| A5 | -0.142425E-5 | -0.199245E-5 | 0.125557E-5 | 0.383760E-5 |
| A6 | 0.595177E-7 | 0.875364E-7 | -0.283661E-7 | -0.158395E-6 |
| A7 | -0.125125E-8 | -0.158542E-8 | 0.176294E-9 | 0.314461E-8 |
| A8 | 0.111880E-10 | 0.859364E-11 | 0.115198E-11 | -0.252758E-10 |
| A10 | -0.386479E-15 | 0.522425E-15 | -0.285095E-15 | 0.507197E-15 |

| r | SEVENTH SURFACE | EIGHTH SURFACE | NINTH SURFACE | TENTH SURFACE |
|---|---|---|---|---|
| K | 0 | 0 | 0 | 0 |
| A3 | 0.344485E-3 | 0.314568E-3 | 0.613564E-5 | 0 |
| A4 | -0.672072E-4 | -0.565030E-4 | -0.640602E-5 | -0.146823E-4 |
| A5 | 0.670190E-5 | 0.542397E-5 | 0.474374E-6 | 0 |
| A6 | -0.375207E-6 | -0.289469E-6 | -0.207663E-7 | 0.310495E-7 |
| A7 | 0.670190E-5 | 0.542397E-5 | 0.474374E-6 | 0 |
| A8 | -0.153717E-9 | -0.107772E-9 | -0.744185E-11 | -0.172595E-10 |
| A10 | 0.142576E-13 | 0.898455E-14 | -0.313648E-15 | 0.209949E-14 |

FIG. 8

| r | R [mm] | d [mm] | n | νd |
|---|---|---|---|---|
| 1 | 64.656 | 6.50 | 1.492 | 58 |
| 2 | 521.328 | 5.54 | | |
| 3 | −87.735 | 4.52 | 1.492 | 58 |
| 4 | −282.726 | 9.18 | | |
| 5 | 62.000 | 22.22 | 1.517 | 64 |
| 6 | −157.000 | 16.19 | | |
| 7 | −280.028 | 6.10 | 1.492 | 58 |
| 8 | −81.206 | 22.10 | | |
| 9 | −36.310 | 3.98 | 1.492 | 58 |
| 10 | −40.645 | 8.40 | 1.437 | 73 |
| 11 | ∞ | 14.10 | 1.562 | 56 |
| 12 | −350.000 | | | |

FIG. 9

| r | FIRST SURFACE | SECOND SURFACE | THIRD SURFACE | FOURTH SURFACE |
|---|---|---|---|---|
| K | 0 | 0 | 0 | 0 |
| A3 | 0 | 0 | 0 | 0.349152E-4 |
| A4 | -0.284046E-5 | -0.127108E-5 | 0.135195E-4 | 0.268866E-5 |
| A5 | 0 | 0 | 0 | 0.113522E-5 |
| A6 | -0.114270E-9 | 0.602714E-8 | -0.724592E-8 | -0.781941E-7 |
| A7 | 0 | 0 | 0 | 0.187344E-8 |
| A8 | -0.638994E-13 | -0.399624E-11 | 0.341672E-11 | -0.153802E-10 |
| A10 | 0.545431E-16 | -0.856730E-15 | -0.824657E-15 | -0.911297E-16 |

| r | SEVENTH SURFACE | EIGHTH SURFACE | NINTH SURFACE | TENTH SURFACE |
|---|---|---|---|---|
| K | 0 | 0 | -1.0 | -1.0 |
| A3 | 0.206195E-3 | 0.577677E-4 | -0.554260E-4 | -0.701111E-4 |
| A4 | -0.392755E-4 | -0.777312E-6 | -0.125937E-5 | 0.315337E-5 |
| A5 | 0.360207E-5 | -0.457713E-6 | 0.263397E-7 | -0.327527E-6 |
| A6 | -0.189864E-6 | 0.376528E-7 | 0.789022E-8 | 0.207614E-7 |
| A7 | 0.522182E-8 | -0.134854E-8 | -0.921401E-9 | -0.891456E-9 |
| A8 | -0.635499E-10 | 0.193346E-10 | 0.256170E-10 | 0.167128E-10 |
| A10 | 0.588535E-14 | -0.279405E-15 | -0.614170E-14 | -0.267006E-14 |

FIG. 13

| r | R [mm] | d [mm] | n | νd |
|---|---|---|---|---|
| 1 | 78.864 | 6.50 | 1.593 | 30 |
| 2 | 387.763 | 5.76 | | |
| 3 | −79.369 | 6.00 | 1.492 | 58 |
| 4 | −156.740 | 10.00 | | |
| 5 | 59.257 | 22.00 | 1.517 | 64 |
| 6 | −182.058 | 16.70 | | |
| 7 | −232.807 | 5.55 | 1.593 | 30 |
| 8 | −90.926 | 22.00 | | |
| 9 | −36.310 | 3.98 | 1.492 | 58 |
| 10 | −40.645 | 8.40 | 1.437 | 73 |
| 11 | ∞ | 14.10 | 1.562 | 56 |
| 12 | −350.000 | | | |

F I G. 1 4

| r | FIRST SURFACE | SECOND SURFACE | THIRD SURFACE | FOURTH SURFACE |
|---|---|---|---|---|
| K | 0 | 0 | 0 | 0 |
| A3 | -0.821884E-4 | -0.122826E-3 | 0.125298E-3 | 0.240689E-3 |
| A4 | 0.117891E-4 | 0.210575E-4 | -0.394224E-5 | -0.289119E-4 |
| A5 | -0.119279E-5 | -0.196648E-5 | 0.756167E-6 | 0.301260E-5 |
| A6 | 0.500916E-7 | 0.910683E-7 | -0.261603E-7 | -0.142798E-6 |
| A7 | -0.105626E-8 | -0.185455E-8 | 0.465065E-9 | 0.325592E-8 |
| A8 | 0.955169E-11 | 0.136513E-10 | -0.462957E-11 | -0.311864E-10 |
| A10 | -0.348654E-15 | 0.246430E-16 | 0.311104E-15 | 0.132149E-14 |

| r | SEVENTH SURFACE | EIGHTH SURFACE | NINTH SURFACE | TENTH SURFACE |
|---|---|---|---|---|
| K | 0 | 0 | 0 | 0 |
| A3 | 0.354696E-3 | 0.297328E-3 | 0.182757E-3 | 0 |
| A4 | -0.681871E-4 | -0.573075E-4 | -0.879617E-4 | -0.573888E-4 |
| A5 | 0.646521E-5 | 0.553220E-5 | 0.112572E-4 | 0 |
| A6 | -0.356274E-6 | -0.303658E-6 | -0.733813E-6 | 0.144257E-6 |
| A7 | 0.105641E-7 | 0.895130E-8 | 0.255074E-7 | 0 |
| A8 | -0.141154E-9 | -0.118334E-9 | -0.389253E-9 | -0.121278E-9 |
| A10 | 0.143037E-13 | 0.119115E-13 | 0.431826E-13 | 0.343856E-13 |

FIG. 18

| r | R [mm] | d [mm] | n | νd |
|---|---|---|---|---|
| 1 | 79.923 | 6.50 | 1.585 | 30 |
| 2 | 466.522 | 5.58 | | |
| 3 | -78.652 | 6.00 | 1.492 | 58 |
| 4 | -159.750 | 10.00 | | |
| 5 | 59.251 | 22.00 | 1.517 | 64 |
| 6 | -178.661 | 16.70 | | |
| 7 | -244.377 | 6.00 | 1.585 | 30 |
| 8 | -91.082 | 22.00 | | |
| 9 | -36.310 | 3.98 | 1.492 | 58 |
| 10 | -40.645 | 8.40 | 1.437 | 73 |
| 11 | ∞ | 14.10 | 1.562 | 56 |
| 12 | -350.000 | | | |

F I G. 1 9

| r | FIRST SURFACE | SECOND SURFACE | THIRD SURFACE | FOURTH SURFACE |
|---|---|---|---|---|
| K | 0 | 0 | 0 | 0 |
| A3 | -0.103481E-3 | -0.158937E-3 | 0.810003E-4 | 0.193423E-3 |
| A4 | 0.146677E-4 | 0.269029E-4 | 0.179408E-5 | -0.223887E-4 |
| A5 | -0.142548E-5 | -0.248302E-5 | 0.437258E-6 | 0.263397E-5 |
| A6 | 0.598095E-7 | 0.117211E-6 | -0.156918E-7 | -0.132560E-6 |
| A7 | -0.125478E-8 | -0.254076E-8 | 0.269152E-9 | 0.315643E-8 |
| A8 | 0.112464E-10 | 0.214470E-10 | -0.309168E-11 | -0.316219E-10 |
| A10 | -0.406552E-15 | -0.471369E-15 | 0.325646E-15 | 0.154477E-14 |

| r | SEVENTH SURFACE | EIGHTH SURFACE | NINTH SURFACE | TENTH SURFACE |
|---|---|---|---|---|
| K | 0 | 0 | 0 | 0 |
| A3 | 0.260346E-3 | 0.199213E-3 | 0.159724E-3 | 0 |
| A4 | -0.526297E-4 | -0.411575E-4 | -0.840975E-4 | -0.567943E-4 |
| A5 | 0.509256E-5 | 0.409916E-5 | 0.108914E-4 | 0 |
| A6 | -0.288161E-6 | -0.231152E-6 | -0.712951E-6 | 0.142850E-6 |
| A7 | 0.872295E-8 | 0.693060E-8 | 0.248349E-7 | 0 |
| A8 | -0.118539E-9 | -0.925199E-10 | -0.379373E-9 | -0.12007E-9 |
| A10 | 0.123691E-13 | 0.950689E-14 | 0.420707E-13 | 0.340579E-13 |

F I G. 2 1
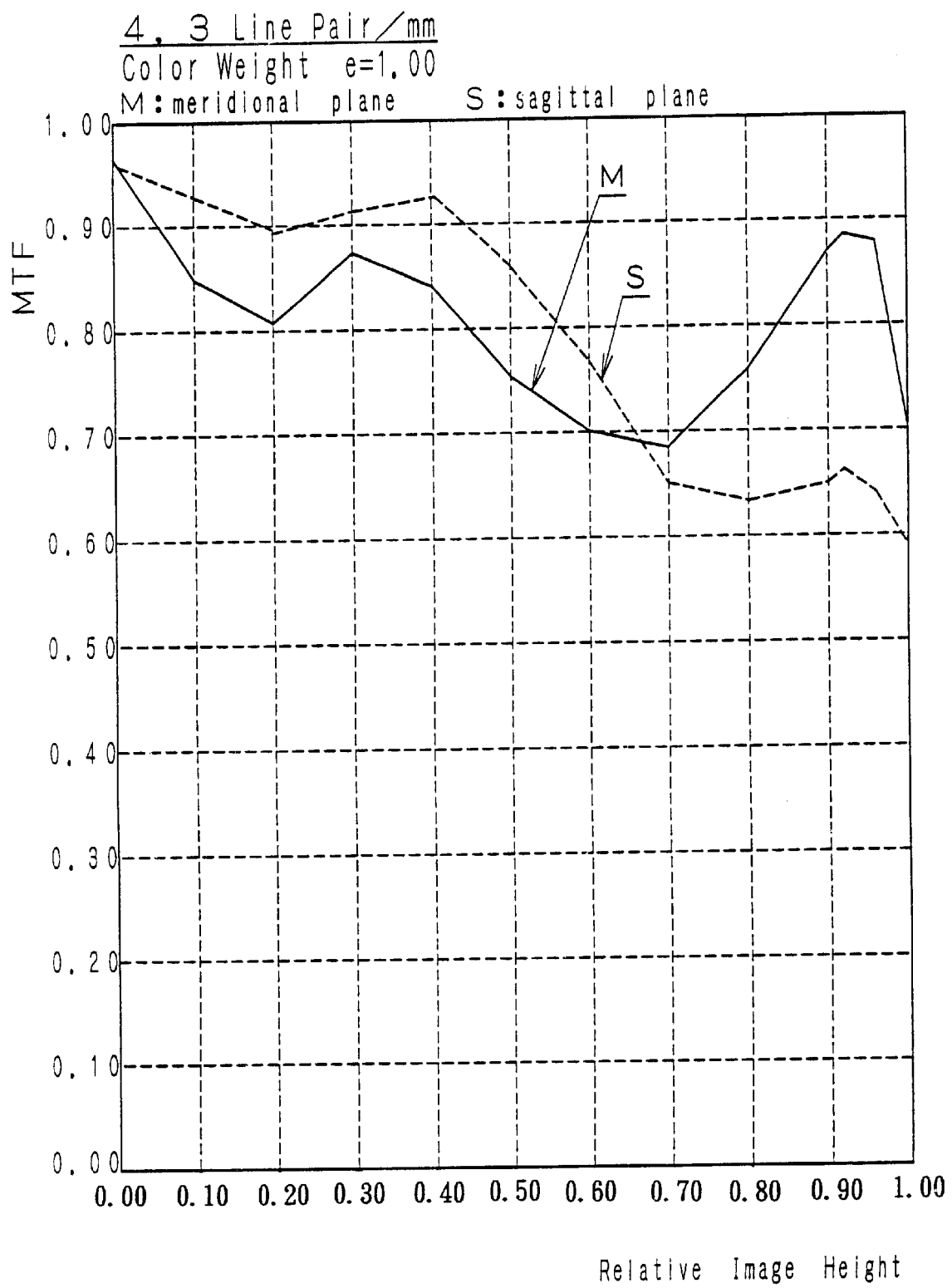

| r | R [mm] | d [mm] | n | νd |
|---|---|---|---|---|
| 1 | 77.005 | 9.00 | 1.620 | 24 |
| 2 | 264.461 | 6.15 | | |
| 3 | -136.647 | 7.00 | 1.492 | 58 |
| 4 | -1039.961 | 12.00 | | |
| 5 | 55.666 | 25.61 | 1.517 | 64 |
| 6 | -230.869 | 14.00 | | |
| 7 | -187.284 | 6.48 | 1.620 | 24 |
| 8 | -89.584 | 23.00 | | |
| 9 | -36.310 | 3.98 | 1.492 | 58 |
| 10 | -40.645 | 15.50 | 1.437 | 73 |
| 11 | -343.000 | 6.70 | 1.562 | 56 |
| 12 | -350.000 | | | |

F I G. 24

| r | FIRST SURFACE | SECOND SURFACE | THIRD SURFACE | FOURTH SURFACE |
|---|---|---|---|---|
| K | 0 | 0 | 0 | 0 |
| A3 | 0 | 0 | 0.147388E-3 | 0.171111E-3 |
| A4 | -0.245734E-5 | -0.217105E-5 | -0.172943E-4 | -0.231945E-4 |
| A5 | 0 | 0 | 0.191801E-5 | 0.252640E-5 |
| A6 | 0.111978E-8 | 0.577250E-8 | -0.821607E-7 | -0.120703E-6 |
| A7 | 0 | 0 | 0.192490E-8 | 0.283587E-8 |
| A8 | -0.449140E-12 | -0.309645E-11 | -0.213451E-10 | -0.288128E-10 |
| A10 | 0.747558E-16 | 0.592739E-15 | 0.147197E-14 | 0.155262E-14 |

| r | SEVENTH SURFACE | EIGHTH SURFACE | NINTH SURFACE | TENTH SURFACE |
|---|---|---|---|---|
| K | 0 | 0 | 0 | 0 |
| A3 | -0.259705E-3 | -0.322031E-3 | 0 | 0 |
| A4 | 0.403294E-4 | 0.583972E-4 | 0.169766E-5 | 0 |
| A5 | -0.427277E-5 | -0.614741E-5 | 0 | 0 |
| A6 | 0.249593E-6 | 0.359675E-6 | 0.176083E-9 | 0 |
| A7 | -0.839226E-8 | -0.117079E-7 | 0 | 0 |
| A8 | 0.129486E-9 | 0.173394E-9 | 0.675139E-12 | 0 |
| A10 | -0.148615E-13 | -0.187694E-13 | 0.150839E-15 | 0 |

FIG. 28

| r | R [mm] | d [mm] | n | νd |
|---|---|---|---|---|
| 1 | 86.838 | 6.50 | 1.620 | 24 |
| 2 | 295.653 | 8.94 | | |
| 3 | −69.298 | 4.10 | 1.492 | 58 |
| 4 | −103.780 | 13.87 | | |
| 5 | 86.438 | 26.00 | 1.517 | 64 |
| 6 | −160.450 | 21.38 | | |
| 7 | −511.291 | 6.50 | 1.620 | 24 |
| 8 | −132.496 | 29.77 | | |
| 9 | −48.679 | 3.00 | 1.492 | 58 |
| 10 | −50.942 | 8.40 | 1.437 | 73 |
| 11 | ∞ | 14.10 | 1.562 | 56 |
| 12 | −350.000 | | | |

F I G. 29

| r | FIRST SURFACE | SECOND SURFACE | THIRD SURFACE | FOURTH SURFACE |
|---|---|---|---|---|
| K | 0 | 0 | 0 | 0 |
| A3 | -0.498837E-5 | -0.216948E-4 | -0.578818E-4 | -0.392709E-4 |
| A4 | -0.118927E-5 | 0.104092E-5 | 0.107104E-4 | 0.810735E-5 |
| A5 | 0.128348E-7 | -0.977498E-7 | -0.414964E-7 | 0.120838E-6 |
| A6 | 0.120989E-9 | 0.247990E-8 | -0.263768E-8 | -0.798517E-8 |
| A7 | -0.230262E-10 | 0.536800E-10 | -0.178657E-11 | -0.168267E-10 |
| A8 | 0.294375E-12 | -0.179254E-11 | 0.962396E-12 | 0.266176E-11 |
| A10 | -0.2705547E-17 | 0.175754E-15 | -0.149944E-15 | -0.332109E-15 |

| r | SEVENTH SURFACE | EIGHTH SURFACE | NINTH SURFACE | TENTH SURFACE |
|---|---|---|---|---|
| K | 0 | 0 | 0 | 0 |
| A3 | -0.930582E-5 | -0.261274E-4 | -0.456769E-4 | 0 |
| A4 | -0.170951E-7 | 0.126984E-5 | 0.524052E-5 | 0 |
| A5 | -0.570756E-7 | -0.301537E-7 | -0.546954E-6 | 0 |
| A6 | 0.310602E-8 | -0.808304E-9 | 0.263259E-7 | 0 |
| A7 | -0.894483E-10 | 0.458801E-10 | -0.606538E-9 | 0 |
| A8 | 0.852017E-12 | -0.815157E-12 | 0.589780E-11 | 0 |
| A10 | 0.754637E-16 | 0.179331E-15 | -0.231727E-15 | 0 |

PROJECTION LENS

BACKGROUND OF THE INVENTION

1. Field of the Invention

The present invention relates to projection lenses, and more particularly, relates to projection lenses for use as television projectors.

2. Discussion of Related Art

In recent years, television projectors have been widely used as a display apparatus which magnifies an image and displays the magnified image on a wide screen. Examples of the image treated in such a television projectors include, as well as images displayed on a display unit of a television set, images produced by electronic visual devices, such as VTR, LD and the like.

In order to reduce the size, weight and manufacturing cost of the overall television projector, it is necessary to reduce the size, weight and manufacturing cost of a projector lens used as a component device of the television projector. In the projector lens, it is required to suppress occurrence of various aberrations so as to achieve excellent optical characteristics because the projector lens have a considerably large magnifying power.

A conventional projection lens is constituted by a plurality of (e.g. five or six) lens units so that not only a desired large magnifying power but also excellent optical characteristics can be achieved. In such a constitution, for the power lens unit, which serves to assure the magnifying power and brightness of the formed image and to prevent focal shift, a glass lens element is employed. Also, for the other lens units, aspherical plastic lens elements made of an acrylic resin are employed. The reason for employing plastic lens elements is that plastic lens elements are easy to form and contribute to reducing the weight and manufacturing cost of the overall projection lens. The reason for employing acrylic resin is that the lens element made of acrylic resin exhibits a relatively large Abbe number (i.e. distribution range of wavelengths becomes narrow) compared with lens elements made of plastic materials.

Meanwhile, in recent years, many images treated by television projectors are colored ones. Accordingly, it is important for the television projectors to exhibit smaller aberrations, above all, smaller color aberrations. In the field of television projectors for high-vision television, which requires a high resolution, it is strongly demanded to achieve high optical performances, including a performance of suppressing color aberrations.

However, generally speaking, it is very difficult to completely suppress such color aberrations throughout the entire image projected on the screen through a projector lens because the projector lens consists of a plurality of lens units.

Under the above circumstances, it has been demanded to enhance the optical characteristics in the projector lens.

In this respect, the plastic lens element made of acrylic resin serves to suppress color aberrations effectively to some extent because the lens element made of acrylic resin has a large Abbe number, as mentioned above. However, the extent of the lens element made of acrylic resin is not sufficient for the level demanded.

SUMMARY OF THE INVENTION

The present invention is accomplished in view of the above-described problems. It is therefore an object of the present invention to provide a projection lens which exhibits more enhanced optical characteristics, such as a lower color aberrations, than conventional ones.

To achieve this object, the present invention provides a projection lens comprising: a power lens unit; one or more image-side lens units, provided on the image side with respect to the power lens, for correcting an aberration; and one or more opposite-image-side lens units, provided on the side opposite to the image side with respect to the power lens, for correcting an aberration, wherein the power lens unit includes a lens element made of a glass material having an Abbe number falling within a range from 50 to 75, the one or more image-side lens units include a lens element made of a plastic material having an Abbe number falling within a range from 20 to 35, and a lens element made of a plastic material having an Abbe number falling within a range from 50 to 60, and the one or more opposite-image-side lens units include a lens element made of a plastic material having an Abbe number falling within a range from 20 to 35, and a lens element made of a plastic material having an Abbe number falling within a range from 50 to 60.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIG. 1 is a view showing a constitution of a projection lens according to a first embodiment of the present invention;

FIG. 2 is a table containing the specific values of a radius of curvature of a lens surface, an Abbe number, and other characteristics, with respect to each of the lens elements constituting the projection lens according to the first embodiment;

FIG. 3 is a table containing the specific values of the parameters defining the shape of each of the aspherical surfaces of the lens elements constituting the projection lens according to the first embodiment;

FIG. 8 is a table containing the specific values of a radius of curvature of a lens surface, an Abbe number, and the other characteristics, with respect to each of the lens elements constituting the conventional projection lens;

FIG. 9 is a table containing the parameters defining each of the aspherical surfaces of the lens elements constituting the conventional projection lens;

FIG. 13 is a table containing the specific values of a radius of curvature of a lens surface, an Abbe number, and the other characteristics, with respect to each of the lens elements constituting the projection lens according to the second embodiment;

FIG. 14 is a table containing the specific values of the parameters defining each of the aspherical surfaces of lens elements constituting the projection lens according to the second embodiment;

FIG. 18 is table containing the specific values of a radius of curvature of a lens surface, an Abbe number, and other characteristics, with respect to each of the lens elements constituting the projection lens according to the third embodiment;

FIG. 19 is a table containing the specific values of the parameters defining each of the aspherical surfaces of the lens elements constituting the projection lens according to the third embodiment;

FIG. 21 is a characteristic diagram showing the MTF characteristic in the projection lens according to the third embodiment;

FIG. 23 is a table containing the specific values of a radius of curvature of a lens surface, an Abbe number, and other characteristics, with respect to each of the lens elements constituting the projection lens according to the fourth embodiment;

FIG. 24 is a table containing the specific values of the parameters defining each of the aspherical surfaces of the lens elements constituting the projection lens according to the fourth embodiment;

FIG. 28 is a table containing specific values of a radius of curvature of a lens surface, an Abbe number, and other characteristics, with respect to each of the lens elements constituting the projection lens according to the fifth embodiment;

FIG. 29 is a table containing the specific values of the parameters defining each of the aspherical surfaces of each of the lens elements constituting the projection lens according to the fifth embodiment;

DETAILED DESCRIPTION OF THE INVENTION

Figure 4A:
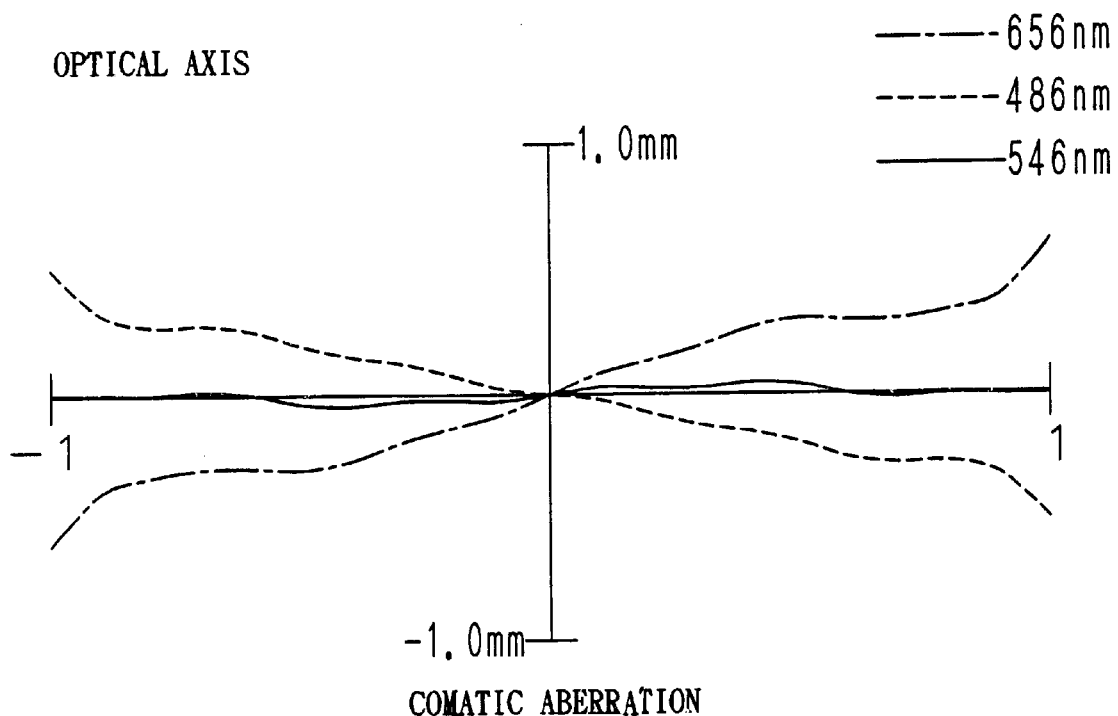
FIGS. 4A and 4B are characteristic diagrams each showing the comatic aberrations with respect to the three types of wavelengths in the projection lens according to the first embodiment.

Hereinafter, preferred embodiments of a project lens according to the present invention will be described with reference to the attached drawings. In the following specification and appended claims, the term "lens unit" refers to a group of one or more lens elements (or lens components) which constitutes the projection lens and provides a defined optical function or functions in the projection lens.

(A) First Embodiment

Hereinafter, a projection lens according to a first embodiment of the present invention will be described in detail with reference to the attached drawings.

FIG. 1 is a view showing a constitution of a projection lens 1A according to the first embodiment. In FIG. 1, the shape of each surface of each lens element (hereinafter, a surface of a lens element will be often referred to as "lens surface"), a thickness of each lens element at the optical axis (hereinafter, thickness of a lens element is often referred to as "lens thickness"), and a distances between the lens surfaces, facing each other, of neighboring lens elements (hereinafter a distance between the lens surfaces, facing each other, of neighboring lens elements will be often referred to as "lens gap") at the optical axis in the projection lens 1A are schematically shown.

FIG. 2 is a table containing specific values of: R1 to R12 each representing a radius of curvature at the optical axis with respect to the lens surfaces r1 to r12; d1 to d12 each representing a lens thickness and a lens gap at the optical axis with respect to each lens element and each lens gap; nd1, nd3, nd5, nd7, nd9, nd10 and n11 each representing a refractive index (refractive index at d line) of each lens element; and vd1, vd3, vd5, vd7, vd9, vd10 and vd11 each representing an Abbe number of each lens element. It should be noted that specific values of a refractive index and an Abbe number of each lens element are set forth in the blanks for the image-end surface of the lens element.

FIG. 3 is a table containing the specific values of the parameters K and A3 to A10, which appears in equations (1) and (2) set forth below. Equations (1) and (2) serve to define the shape of each of the aspherical surfaces r1 to r4 and r7 to r10 of the lens elements constituting the projection lens 1A. That is, each aspherical surface of the lens elements constituting the projection lens is determined as a rotation-symmetrical aspherical surface which meets the relationship defined by equations (1) and (2).

$$X = \frac{C\rho^2}{1 + \sqrt{1-(K+1)C^2\rho^2}} + \qquad (1)$$

-continued $$\sum_{i=2}^{5} A_{2i}\rho^{2i} + A_3\rho^3 + A_5\rho^5 + A_7\rho^7$$

$$\rho = \sqrt{Y^2 + Z^2} \qquad (2)$$

wherein C represents a vertex paraxial curvature, K represents a conic constant, and A3 to A10 each represents an aspherical coefficient in the rectangular coordinate system in which the direction of the optical axis is determined as X-axis.

It should be noted that the term "rotation-symmetrical ashpherical surface" refers to an aspherical surface which always exhibits the same aspherical shape even when the aspherical surface is rotated around the optical axis by any degree.

Referring to FIG. 1, the constitution of the projection lens 1A of the first embodiment will be described in detail.

The projection lens 1A of the first embodiment includes, from the image end, a first lens unit 2, a second lens unit 3, a third lens unit 4, a fourth lens unit 5, and a fifth lens unit 6.

The first lens unit 2 is constituted by a single lens element in the first embodiment. The single lens element, which constitutes the first lens unit 2, has aspherical surfaces r1 and r2 each providing a positive optical power in the region at and adjacent to the optical axis and a negative optical power at the marginal regions thereof, and serves to chiefly correct spherical aberrations occurring at an image height of approximately 0.5 to 0.8 and a comatic aberration of the lowermost ray of off-axis rays. It should be noted that, throughout the specification of the present application, each image height is expressed as a relative image height obtained by normalizing the value of the absolute image height into a value falling within a range from 0.0 to 1.0.

The second lens unit 3 is also constituted by a single lens element in the first embodiment. The single lens element, which constitutes the second lens unit 3, has aspherical surfaces r3 and r4 each providing a negative optical power in the region at and adjacent to the optical axis and a negative optical power at the marginal regions thereof, and serves to chiefly correct spherical aberrations occurring at an image height of approximately 1.0.

The third lens unit 4 is also constituted by a single lens element in the first embodiment. The third lens element has spherical surfaces r5 and r6. The third lens unit 4 provides the strongest positive optical power of all the lens units constituting the projection lens A1. Namely, the third lens unit 4 most contributes to achieving a desired magnification.

The fourth lens unit 5 is also constituted by a single lens element in the first embodiment. The single lens element, which constitutes the fourth lens unit 5, has aspherical surfaces r7 and r8 each providing a positive optical power, and serves chiefly to correct comatic aberrations of the uppermost ray of off-axis rays and to correct back focus caused by temperature change.

The fifth lens unit 6 serves as a lens unit which corrects almost all the field curvature occurring in the projection lens 1A. Hereinafter, the fifth lens unit 6 will be referred to as "field curvature correction unit". The field curvature correction unit 6 is constituted by a first lens element 6A, a second lens element 6B and a third lens element 6C which form a single cemented lens element. The first lens element 6a serves chiefly to correct the curvature of field. The second lens element 6B is interposed between the first lens element 6A and the third lens element 6C, and is constituted by cooling liquid. The third lens element 6C serves as a unit which is in contact with the surface of the tube of the CRT (cathode ray tube) display device (not shown) and receives the rays emitted from the CRT device (hereinafter the third lens element 6C is often referred to as "contact incident unit"). The surface r12 of the third lens element 6C, which is positioned opposite to the image end and in contact with the surface of the tube of the CRT display device, is formed in the same shape as that of the tube surface of the CRT display.

The achromatic performance, i.e., the performance of preventing chromatic aberration from occurring is realized by the collaboration of the first lens unit 2, the second lens unit 3, the third lens unit 4, the fourth lens unit 5, and the first lens element 6A of the field curvature correction unit 6, and so on. In other words, the achromatic performance is realized by a comprehensive lens system including these lens units and lens elements. Meanwhile, generally speaking, it is more difficult to achieve achromatic performance in a projection lens consisting of five lens units, like the projection lens 1A of the first embodiment, than in a projection lens consisting of six lens units because the number of lens elements is smaller. Under the circumstances, in the present invention, such a comprehensive lens system is employed for compensating for the relatively poor achromatic performance of the projection lens consisting of five lens units.

The materials employed for each lens unit or lens element in the projection lens 1A of the first embodiment will be described.

The third lens unit 4 is constituted by a glass lens element (the glass is BK7 glass) having a refractive index nd of 1.517 and an Abbe number vd of 64 as shown in FIG. 2.

This is because the third lens unit 4 requires a large positive optical power, which cannot be easily achieved by a plastic lens element. Also, each of the surfaces r5 and r6 of the third lens unit 4 is formed in a sphere shape, as mentioned above. This is because, in the case of a glass lens element, a sphere shape is easy to form and suitable for mass production.

Employing a glass lens element having sphere surfaces as the lens unit 4 serving as the power lens unit (strictly speaking, the other factors or reasons can be mentioned) requires that various types of lens units and lens elements for correcting an aberration (referred to as "aberration correction lens") are provided. In this embodiment, the aberration correction lens is constituted by plastic lenses for reducing the size and weight of the projection lens 1A, as in conventional art.

Specifically, each of the above-mentioned first lens unit 2, the second lens unit 3, the fourth lens unit 5, and the first lens element 6A of the field curvature correction unit 6 is constituted by a plastic lens element because the first lens unit 2, the second lens unit 3, the fourth lens unit 5, and the first lens element 6A of the field curvature correction unit 6 serves as aberration correction lens units which perform the function of correcting various aberrations.

However, unlike conventional aberration correction lens units in which all the lens elements are made of the same plastic material, the materials of the aberration correction lenses of the present invention are different depending on the types of the lenses. Specifically, in the conventional aberration correction lenses, all the aberration correction lenses are made of acrylic resin, such as polymethyl methacrylate (PMMA).

In contrast, in the projection lens 1A of the first embodiment, both of the first lens unit 2 and the fourth lens unit 5 are made of a first plastic material, while both of the second lens unit 3 and the first lens 6A of the field curvature correction lens unit 6 are made of a second plastic material, the first and second plastic materials are different from each other.

Specifically, in the projection lens 1A according to the first embodiment, the first plastic material employed for the first lens unit 2 and the fourth lens unit 5 is a plastic material having a refractive index nd of 1.620 and Abbe number of 24, as shown in FIG. 2. On the other hand, the second plastic material employed for the second lens unit 3 and the first lens element 6A of the field curvature correction unit 6 is a plastic material having a refractive index nd of 1.492 and an Abbe number of 58.

A specific example of the first plastic material is an optical polyester resin (e.g. a commercially available product named "O-PET" provided by KANEBO, LTD.; see the Japanese patent application Laid-open 6-49186). A specific example of the second plastic material is an acrylic resin (polymethyl methacrylate; PMMA), which is a most commonly used plastic lens material.

In the first embodiment, as a cooling liquid which forms the second lens element 6B of the field curvature correction unit 6, a liquid mixture of ethylene glycol and glyceline having a refractive index nd of 1.437 and an Abbe number of 73 is employed. As the third lens element 6C of the field curvature correction unit 6, a lens element made of glass having a refractive index nd of 1.562 and an Abbe number of 56 is employed.

Next, the reason will be explained why the first lens unit 2 and the fourth lens unit 5 are constituted by the optical polyester resin, not by an acrylic resin commonly employed.

The power lens unit (third lens unit) 4 is constituted by a glass lens element which has a large Abbe number, i.e., which has a small wavelength distribution. The power lens unit 4 has a positive optical power, and accordingly generates color aberrations to some extent when considered as a single unit.

Each of the lens units other than the third lens unit needs to have, as well as its main correcting functions as mentioned above, an achromatic function which contributes to the overall achromatic performance performed the entire projection lens 1A.

Of the lens units other than the third lens unit, the first lens unit 2 and the fourth lens unit 5 particularly contribute to the overall achromatic performance of the projection lens 1A. Specifically, as clearly shown in FIG. 1, unlike the first lens unit 2 and the fourth lens unit 5, each of the second lens unit 3 and the first lens element 6A of the image curvature correction unit 6 has a portion having a generally uniform thickness, and accordingly functions to achromatize the image with respect to only a part of the image height, not with respect to the entire image height. Consequently, from the viewpoint of achromatism, the first lens unit 2 and the fourth lens unit 5 perform critical functions.

When each lens unit is considered as a single unit, it seem that the larger Abbe number (the smaller wavelength distribution) is more preferred from the viewpoint of correction of chromatic aberrations (achromatism). However, the lens units performing achromatic function, which are the first lens unit 2 and the fourth lens unit 5 in the case of the first embodiment, also perform the other correcting functions than achmatism. In view of these respects, attention should be paid so that the first lens unit 2 and the fourth lens unit 5 may not deteriorate their other major correcting functions.

According to the finding by the present inventors, when a lens element having a small Abbe number is employed for the first lens unit 2 and the fourth lens unit 5, each of the first lens unit 2 and the fourth lens unit 5 performs an achromatizing function without impairing its inherent correcting functions. That is, when the achromatizing function is realized by employing a lens element having a small Abbe number, the achromatizing function scarcely affects the shape of the lens surface of each lens element. Accordingly, the shape of the lens surface of each lens element can be determined while taking only its inherent correcting functions. To the contrary, when both its inherent correcting functions and the achromatizing function are attempted to achieve by employing a lens element having a large Abbe number as performed in the conventional projection lens, the achromatizing function considerably affects the shape of the lens, so that its inherent correcting functions may be impaired.

On the other hand, for the second lens unit 3 and the first lens element 6A of the field curvature correction unit 6, a lens element having a large Abbe number is preferred for preventing the generation of color aberration. Specifically, the second lens unit 3 tends to generate color aberrations similar to those produced by the power lens unit (the third lens unit) 4 at the peripheral area thereof (at the area in which a high image field is obtained), and therefore it is preferred to employ a lens element having a larger Abbe number. Each of the surfaces of the first lens element 6A of the field curvature correction unit 6 has a smaller radius of curvature, and a smaller index of refraction, and accordingly has a possibility of increasing degree of color aberration. Accordingly, it is preferred to employ a lens element having a large Abbe number.

Figure 4B:
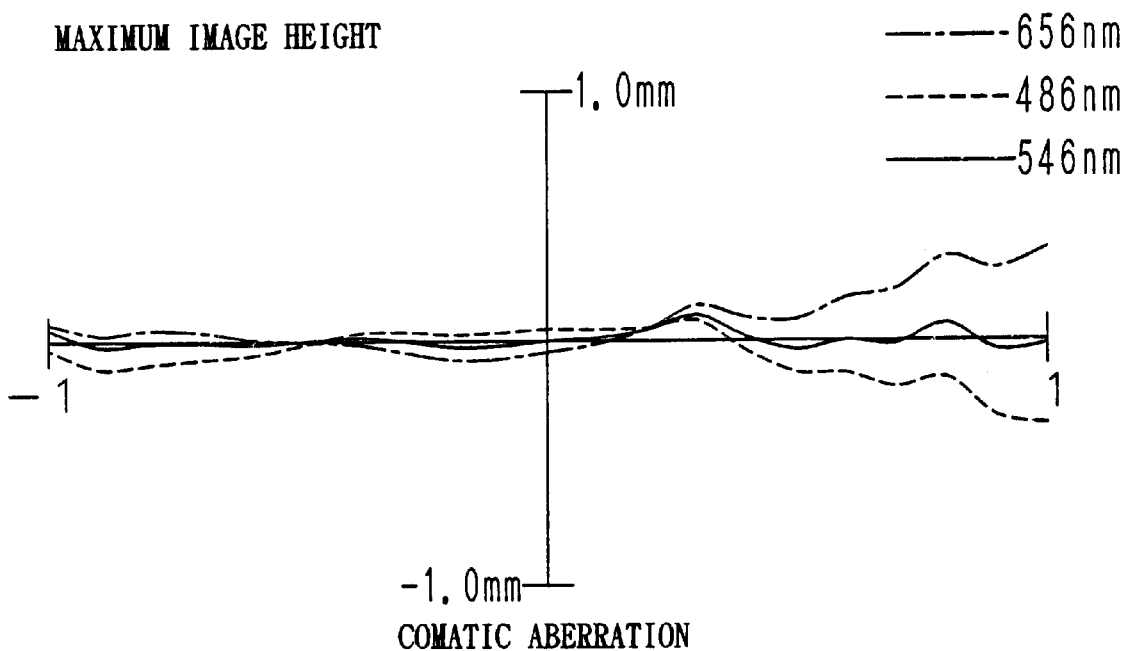
Figure 5:
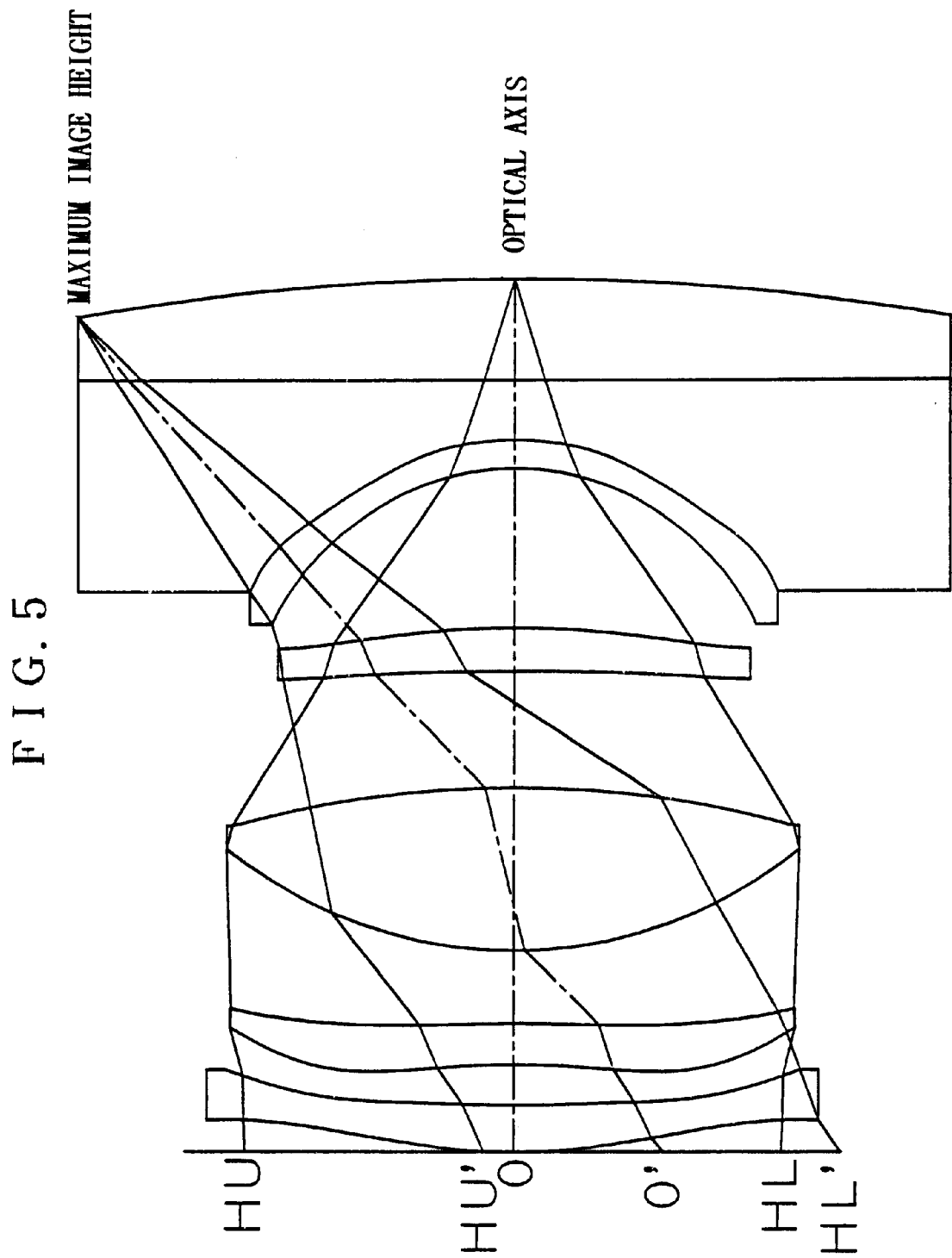
FIG. 5 is a supplementary explanatory view which aids to explain the horizontal axis in FIG. 4.

The comatic aberrations of the three types of wavelengths (i.e. 486 nm, 546 nm and 656 nm) in the projection lens according to the first embodiment are shown in FIG. 4A as to the incident light on the axis, and are shown in FIG. 4B as to the incident light from the highest point of an image. Note that the horizontal axis in FIGS. 4A and 4B are obtained by normalizing each of the range from HU to HL and the range from HU' to HL' on the virtual screen to the range from 1 to −1 as shown in FIG. 5.

Figure 6:
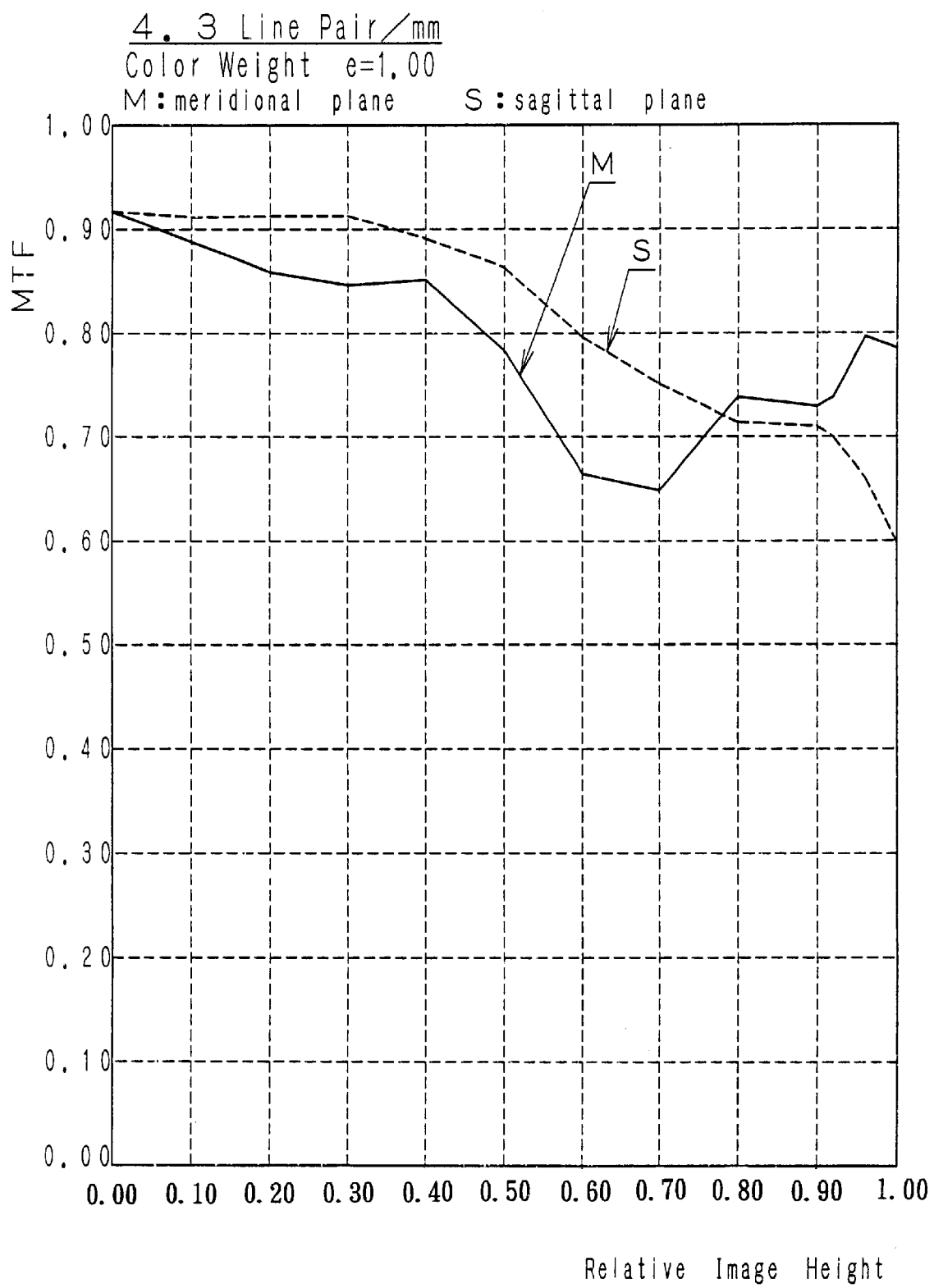
FIG. 6 is a characteristic diagram showing the MTF characteristic in the projection lens according to the first embodiment.

FIG. 6 is a graph showing a modulation transfer function (MTF) characteristic in the projection lens of 1A of the first embodiment. The MTF characteristics shown is of a strip pattern having 4.3 lines per millimeter. FIG. 6 on a meridional image surface (plane) and on a sagittal surface as to the image heights of 0.0 to 1.0. It should be noted that with respect to e line, color weight of a weighting factor of 1 (adjustment for complying with the luminosity factor) is treated. In the projection lens 1A, the focal length is 75.79 mm, the F number is 1.00, and the marginal light amount ratio (i.e. light amount at the maximum image height/light amount at the optical axis, that is, ratio obtained by dividing a light amount at the maximum image height by a light amount at the optical axis) is 31.4%.

Figure 7:
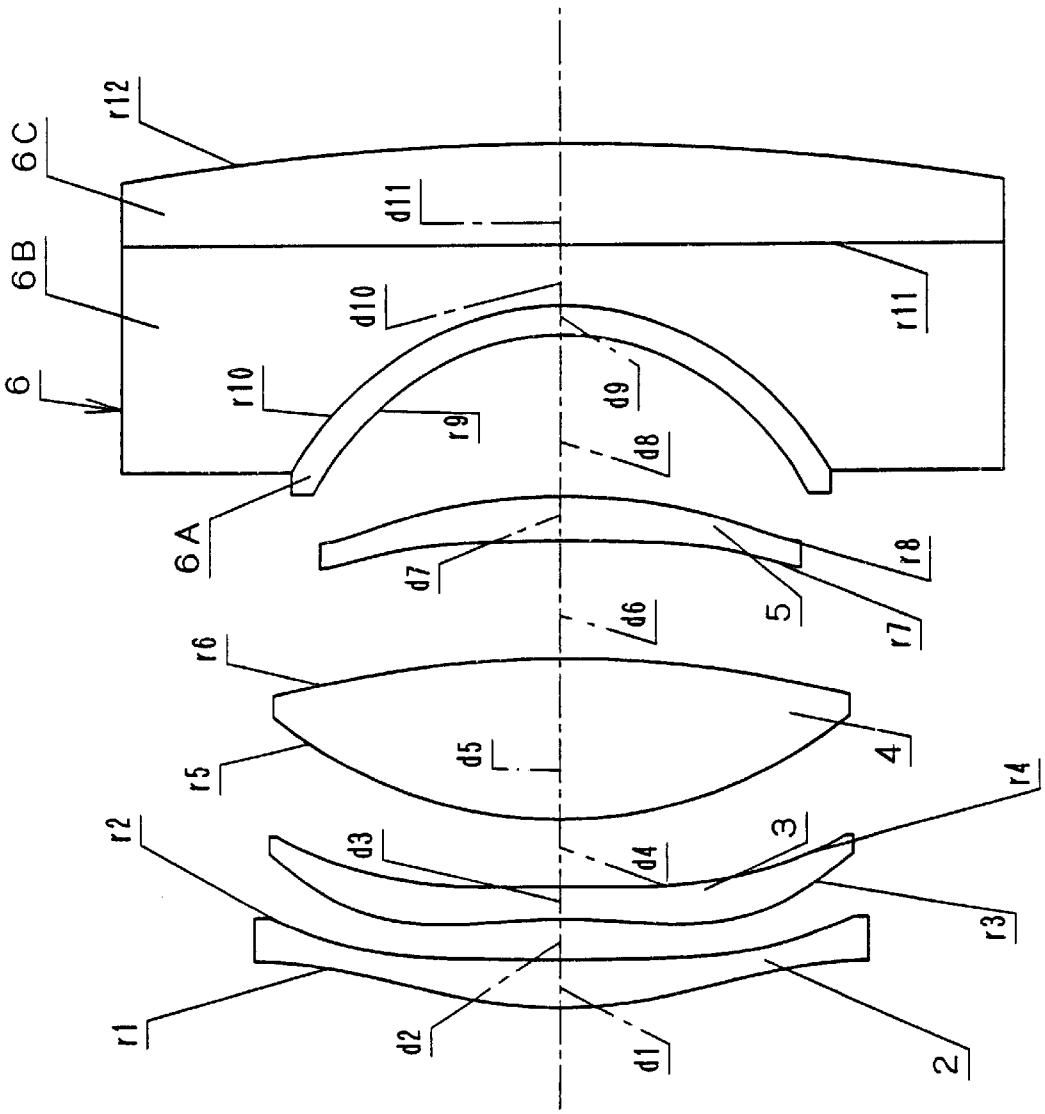
FIG. 7 is a view showing a constitution of a conventional projection lens.
Figure 10A:
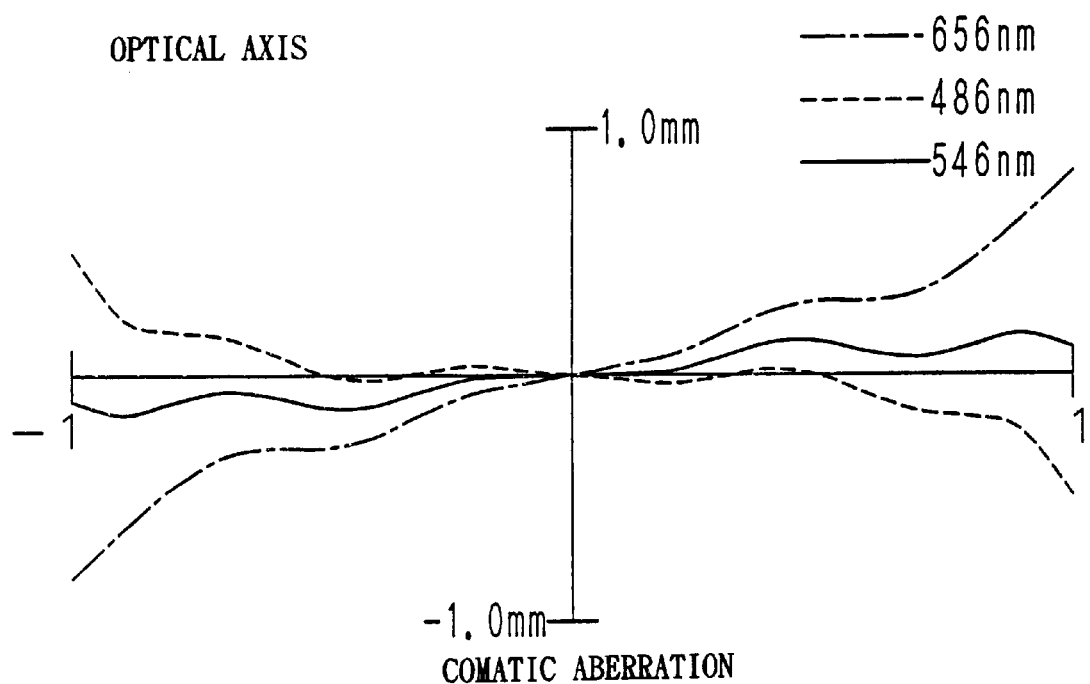
FIGS. 10A and 10B are characteristic diagrams each showing the comatic aberrations with respect to the three types of wavelengths in the conventional projection lens.
Figure 10B:
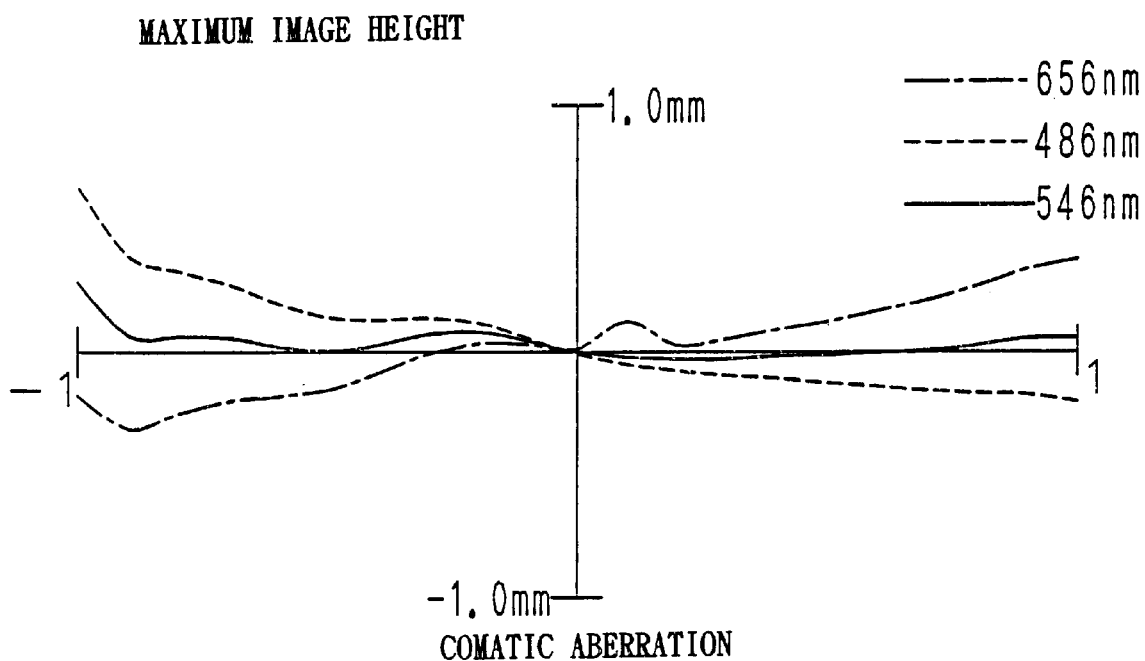
Figure 11:
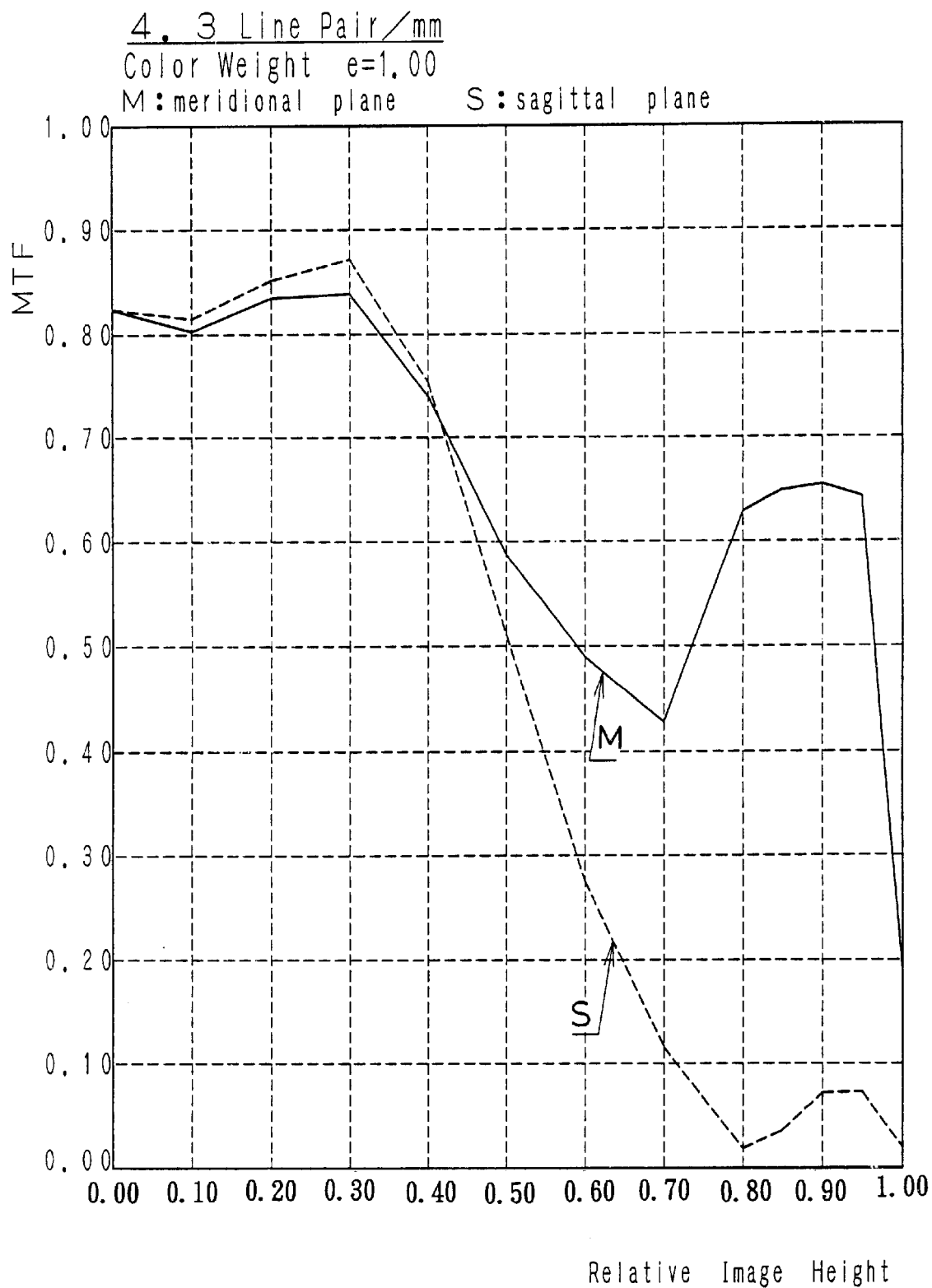
FIG. 11 is a characteristic diagram showing the MTF characteristic in the conventional projection lens.

FIGS. 7 to 9 are views and tables showing constitutions and characteristics of a conventional projection lens having five lens units in which all the plastic lens elements are acrylic resin lens elements, which serves as a comparative example to the first embodiment. FIGS. 7 to 9 correspond to FIGS. 1 to 3 showing the first embodiment, respectively. FIG. 10A shows comatic aberrations of the three types of wavelength (i.e. 486 nm, 546 nm and 656 nm) with respect to the injection light injected from the axis in the conventional system 1, while FIG. 10B shows with respect to the injection light given from the highest point of the image height. FIG. 11 shows MTF characteristic in the conventional projection lens 1.

As is known from comparison between FIGS. 4 and 10, the projection lens 1A according to the first embodiment exhibits smaller color aberrations than that of the conventional projection lens 1.

As is known from FIG. 6, MTF values of the projection lens 1A according to the first embodiment shows at least about 0.6 across the entire range of the image height both in the meridional plane and in the sagittal plane. These data show that the projection lens 1A of the first embodiment has an excellent resolving power, that is, various types of aberrations are corrected in a favorable manner. To the contrary, FIG. 11 shows that, in the conventional projection lens 1, at a considerably wide range across the image height MTF value indicates 0.6 or lower with respect to both the meridional plane and sagittal plane. This comparison shows that the MTF characteristics of the projection lens 1A of the first embodiment is improved greatly compared with the conventional projection lens 1. The MTF characteristic of the projection lens 1A of the first embodiment is sufficient for handling the images on a high-vision television set screen.

In a conventional projection lens, the focal length is 75.89 mm, the F number is 1.00, and the marginal light amount ratio is 30.6%. Thus, the projection lens 1A of the first embodiment is the same as the conventional projection lens in these optical characteristics.

As described above, according to the projection lens of the first embodiment, for the second lens unit, which serves to correct the spherical aberration at an image height of approximately 0.5 to 0.8 and the comatic aberration of the lowermost ray of the off-axis rays, and for the fourth lens unit, which serves to correct the comatic aberration of the uppermost ray of off-axis rays and to correct the back-focus variation caused by temperature change, an lens element made of a optical polyester resin having a small Abbe number is employed. Also, for the second lens unit, which serves to correct the spherical aberration at the image height of an approximately 1.0, and for the first lens unit of the field curvature correction unit, which correct most of the field curvature, a lens element made of an acrylic resin having a large Abbe number is employed. Further, for the third lens unit which serves as the power lens unit, a glass lens element is employed. Owing to this constitution, in the projection lens of the first embodiment, excellent optical characteristics can be realized.

The optical polyester resin has a larger refractive index than the acrylic resin conventionally employed. Owing to this feature, the first lens unit and the fourth lens unit can be made compact, and accordingly the entire projection lens can be made compact.

As described above, the material employed for the first and fourth lens elements of in the first embodiment is a optical polyester resin, and therefore the projection lens of the first embodiment is different from the conventional projection lens in the type of the employed material. However, the projection lens of the third embodiment is the same as the conventional projection lens in that a lens element made of a plastic material is employed. Therefore, reducing the size and weight of the projection lens can be successfully achieved also in the projection lens of the first embodiment.

(B) Second Embodiment

Next, a projection lens according to a second embodiment of the present invention will be described with reference to the attached drawings.

Figure 12:
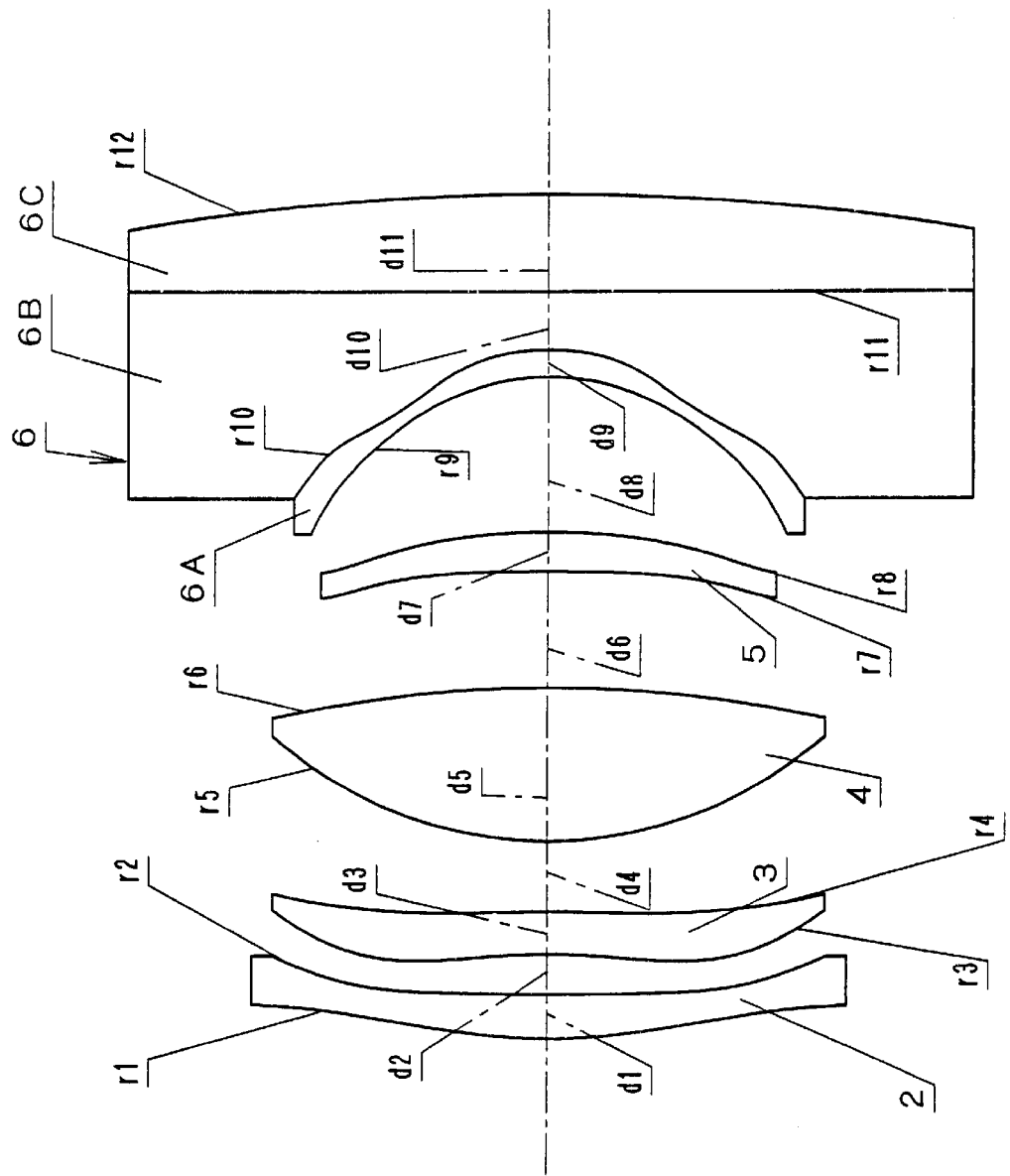
FIG. 12 is a view showing a constitution of a projection lens according to a second embodiment of the present invention.

FIG. 12 is a view showing the constitution of a projection lens 1B according to a second embodiment of the present invention. In FIG. 12, the same reference numerals or symbols are assigned to the elements or portions identical or corresponding to those in the above-mentioned projection lens 1A according to the first embodiment shown in FIG. 1. FIG. 13 is a table containing the specific values, in the projection lens 1B according to the second embodiment, of: a radius of curvature at the optical axis with respect to each lens surface of the lens elements; a lens thickness and lens gap at the optical axis with respect to each lens element; a refractive index (i.e. a refractive index on the d line) with respect to each lens element; and an Abbe number with respect to each lens element. FIG. 14 is a table containing the specific values of the parameters defining each of the aspherical surfaces of lens elements.

As is shown in FIG. 12, the projection lens 1B according to the second embodiment is also constituted by, from the image end, a first lens unit 2, a second lens unit 3, a third lens unit 4, a fourth lens unit 5, and a fifth lens unit (field curvature correction unit) 6, and the major function of each lens unit is the same as that of the corresponding lens unit in the first embodiment.

Specifically, roughly speaking, the first lens unit serves to correct the spherical aberrations at an image height falling within a range from approximately 0.5 to approximately 0.8 and the comatic aberration of the lowermost ray of off-axis rays; the second lens unit 3 serves to correct the spherical aberration at the image height of approximately 1.0; the third lens unit 4 serves as a power lens unit; the fourth lens unit 5 serves to correct the comatic aberrations of the uppermost ray of the off-axis rays and to correct the back focus caused by temperature change; and the field curvature correction unit 6 serves to correct almost all field curvature caused by the projection lens 1B.

The difference of the projection lens 1B from the projection lens 1A is that, for the first lens unit 2 and the fourth lens unit 5, which most contribute to the achromitizing at the projection lens 1B, a lens element made of a plastic material having a refractive index nd of 1.593 and an Abbe number of 30 as shown in FIG. 13 is employed. A specific example of the plastic material having these optical characteristics is polystyrene (PS).

It should be noted that, also in the projection lens 1B, for the second lens unit 3 and the first lens element 6A of the field curvature correction unit 6, a lens element made of acrylic resin (polymethyl methacrylate; PMMA) is employed.

That is, the second embodiment is different from the first embodiment in the type of the material employed for the first lens unit 2 and the fourth lens unit 5. However, the second embodiment is the same as the first embodiment in that the Abbe number of the material employed for the first lens unit 2 and the fourth lens unit 5 is much smaller than that of the material employed for the second lens unit 3 and the first lens element 6A of the field curvature correction unit 6, and in the reason for making such difference in the Abbe numbers.

As described above, since the type of the material of the first lens unit 2 and the fourth lens unit 5 employed in the second embodiment is changed from that employed in the first embodiment while their functions are not changed, the shapes of lens surfaces of the lens elements in the second embodiment are different from those in the first embodiment.

Figure 15A:
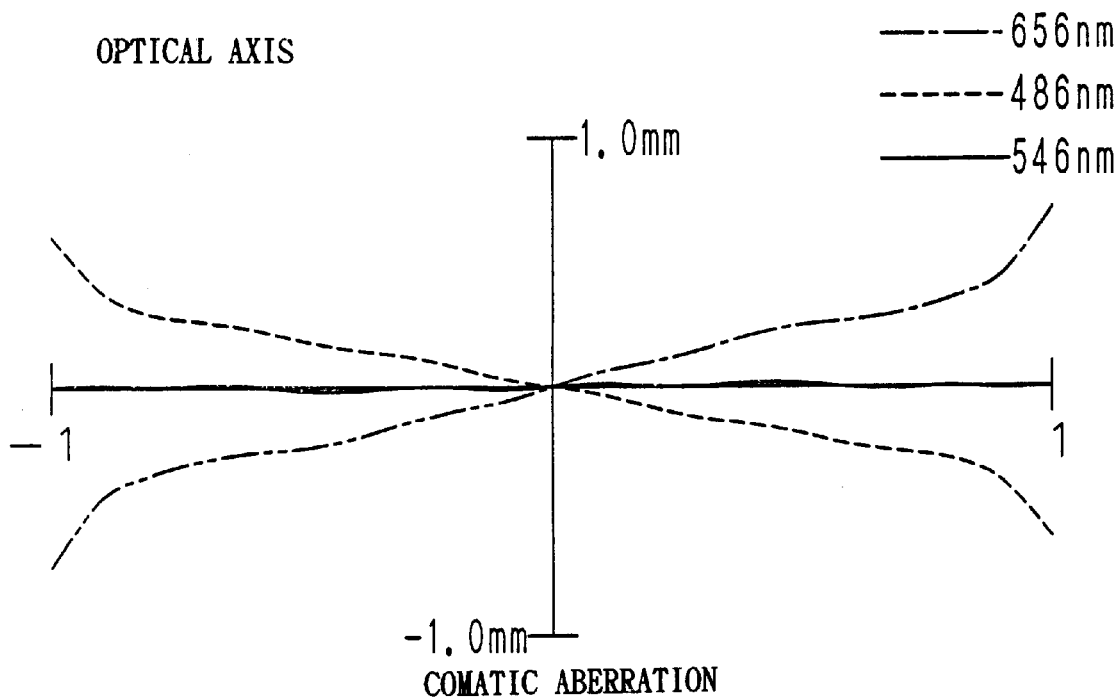
FIGS. 15A and 15B are characteristic diagrams each showing comatic aberrations of an incident light with respect to three types of wavelengths in the projection lens according to the second embodiment.
Figure 15B:
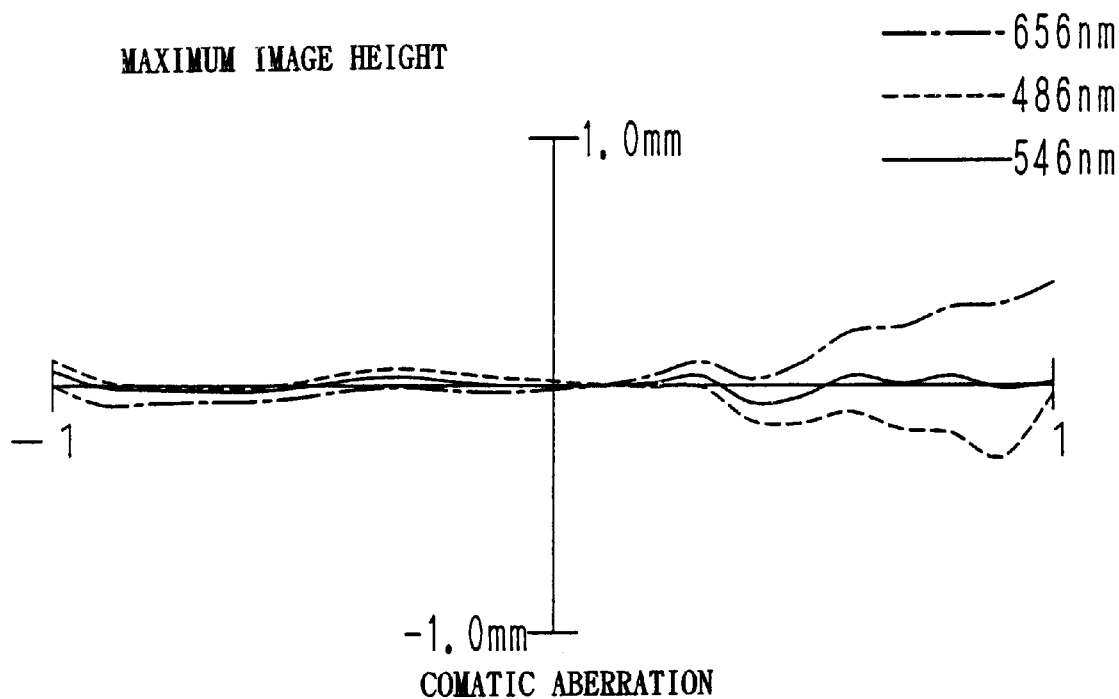

FIG. 15A shows the comatic aberration of the incident light given along the optical axis with respect to three types of wavelengths (i.e. 486 nm, 546 nm and 656 nm) in the projection lens 1B of the second embodiment. FIG. 15B shows the comatic aberration of the incident light given from the maximum image height with respect to the three types of wavelengths (i.e. 486 nm, 546 nm and 656 nm) in the projection lens 1B of the second embodiment. From comparison of FIGS. 15A and 15B regarding the projection lens 1B with FIGS. 10A and 10B regarding the conventional projection lens, it is known that the projection lens 1B of the second embodiment exhibits smaller color aberrations than the conventional projection lens.

Figure 16:
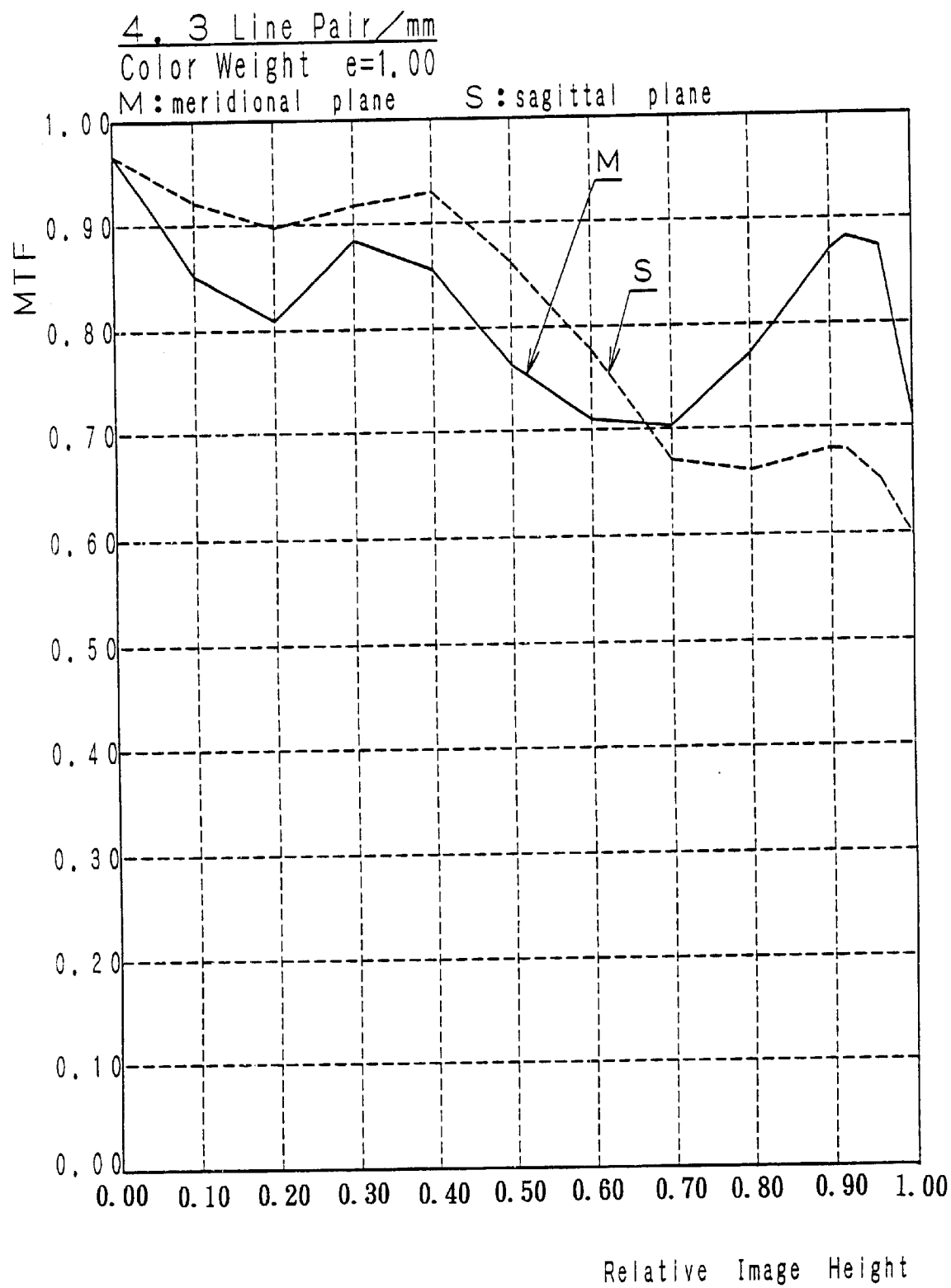
FIG. 16 is a characteristic diagram showing the MTF characteristics in the projection lens according to the second embodiment.

FIG. 16 is a characteristic diagram showing MTF characteristics of the projection lens 1C of the second embodiment. The diagram in FIG. 16 shows that, in the projection lens 1B of the second embodiment, MTF values do not go below approximately 0.6 throughout the entire image height with respect to both the meridional plane and the sagittal plane. From FIG. 16, it is known that the projection lens 1B of the second embodiment exhibits an excellent resolution, i.e., various aberrations including color aberrations are corrected satisfactorily in the projection lens 1B. Further, the comparison between FIGS. 11 and 16 shows that the projection lens 1B of the second embodiment exhibits greatly improved MTF characteristics compared with the conventional projection lens 1.

It should be noted that the projection lens 1B of the second embodiment exhibits a focal length of 75. 82 mm, an F number of 1.00, and a marginal light amount ratio of 31.1%. Thus, each of the values is of substantially the same degree as corresponding ones obtained in the projection lens 1A and conventional projection lenses.

As described above, according to the projection lens of the second embodiment, for the second lens unit, which serves to correct the spherical aberration at the image height of approximately 0.5 to 0.8 and the comatic aberration of the lowermost ray of the off-axis rays, and for the fourth lens unit, which serves to correct the comatic aberration of the uppermost ray of off-axis rays and to correct the back-focus variation caused by temperature change, an lens element made of a polystyrene resin having a small Abbe number is employed. Also, for the second lens unit, which serves to correct the spherical aberration at the image height of an approximately 1.0, and for the first lens unit of the field curvature correction unit, which correct most of the field curvature, a lens element made of an acrylic resin having a large Abbe number is employed. Further, for the third lens unit which serves as the power lens unit, a glass lens element is employed. Owing to this constitution, in the projection lens 1B of the second embodiment, excellent optical characteristics can be realized.

The polystyrene resin has a larger refractive index than the acrylic resin conventionally employed. Owing to this feature, the first lens unit and the fourth lens unit can be made compact, and accordingly the entire projection lens can be made compact.

As described above, the material employed for the first and fourth lens elements of in the second embodiment is a polystyrene resin, and therefore the projection lens of the second embodiment is different from the conventional projection lens in the type of the employed material. However, the projection lens of the third embodiment is the same as the conventional projection lens in that a lens element made of a plastic material is employed. Therefore, reducing the size and weight of the projection lens can be successfully achieved also in the projection lens of the second embodiment.

(C) Third embodiment

Next, a projection lens according to a second embodiment of the present invention will be described with reference to the attached drawings.

Figure 17:
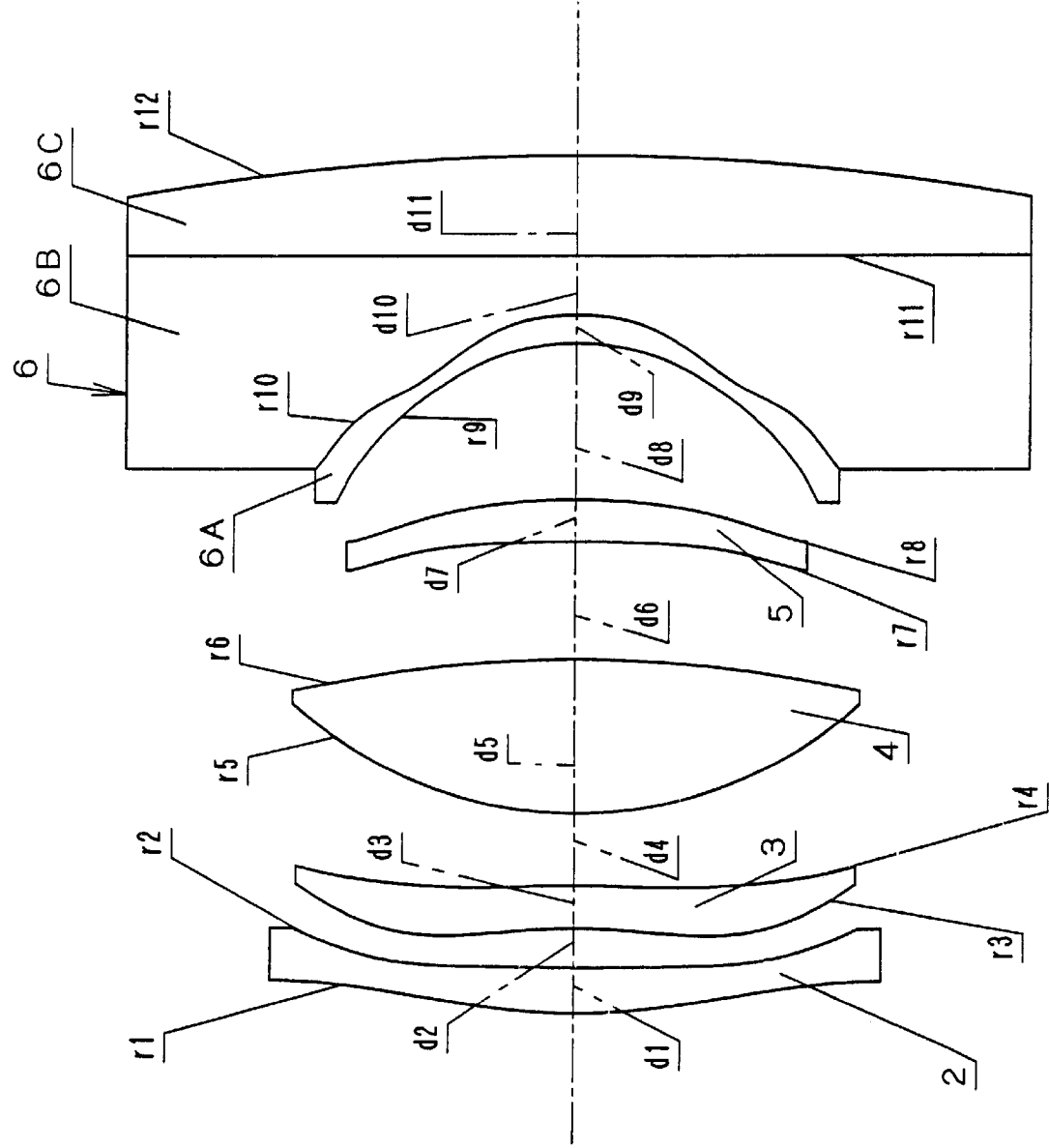
FIG. 17 is a view showing a constitution of a projection lens according to a third embodiment of the present invention.

FIG. 17 is a view showing the constitution of a projection lens 1C according to a third embodiment of the present invention. In FIG. 17, the same reference numerals or symbols are assigned to the elements or portions identical or corresponding to those in the above-mentioned projection lens 1A according to the first embodiment shown in FIG. 1. FIG. 18 is a table containing the specific values, in the projection lens 1C according to the third embodiment, of: a radius of curvature at the optical axis with respect to each lens surface of the lens elements; a lens thickness and a lens gap at the optical axis with respect to each lens element and each lens gap; a refractive index (i.e. a refractive index on the d line) with respect to each lens element; and an Abbe number with respect to each lens element. FIG. 19 is a table containing the specific values of the parameters defining each of the aspherical surfaces of lens elements.

As shown in FIG. 17, the projection lens 1C according to the third embodiment is also constituted by, from the image end, a first lens unit 2, a second lens unit 3, a third lens unit 4, a fourth lens unit 5, and a fifth lens unit (field curvature correction unit) 6, and the major function of each lens unit is the same as that of the corresponding lens unit in the first embodiment.

Specifically, roughly speaking, the first lens unit serves to correct the spherical aberration at an image height falling within a range from approximately 0.5 to approximately 0.8 and the comatic aberration of the lowermost ray of off-axis rays; the third lens unit 3 serves to correct the spherical aberration at the image height of approximately 1.0; the third lens unit 4 serves as a power lens unit; the fourth lens unit 5 serves to correct the comatic aberrations of the uppermost ray of the off-axis rays and to correct the back focus caused by temperature change; and the field curvature correction unit 6 serves to correct almost all the field curvature in the projection lens 1C.

The difference of the projection lens 1C of the third embodiment from the projection lenses 1A and 1B of the first and second embodiments is that, for the first lens unit 2 and the fourth lens unit 5, which most contribute to the achromatizing in the projection lens 1C, a lens element made of a plastic material having a refractive index nd of 1.585 and an Abbe number of 30 as shown in FIG. 18 is employed. A specific example of the plastic material having the optical characteristics is polycarbonate (PC).

It should be noted that, also in the projection lens 1C of the third embodiment, for the third lens unit 3 and the first lens element 6A of the field curvature correction unit 6, a lens element made of acrylic resin (polymethyl methacrylate; PMMA) is employed.

That is, the third embodiment is different from the first and second embodiments in the type of the material employed for the first lens unit 2 and the fourth lens unit 5. However, the third embodiment is the same as the first embodiment in that the Abbe number of the material employed for the first lens unit 2 and the fourth lens unit 5 is much smaller than that of the material employed for the third lens unit 3 and the first lens element 6A of the field curvature correction unit 6, and in the reason for making such difference in the Abbe numbers.

As described above, since the type of the material of the first lens unit 2 and the fourth lens unit 5 employed in the third embodiment is changed from that employed in the first and second embodiments while their functions are not changed, the shapes of lens surfaces of the lens elements in the third embodiment are different from those in the first and second embodiments.

Figure 20A:
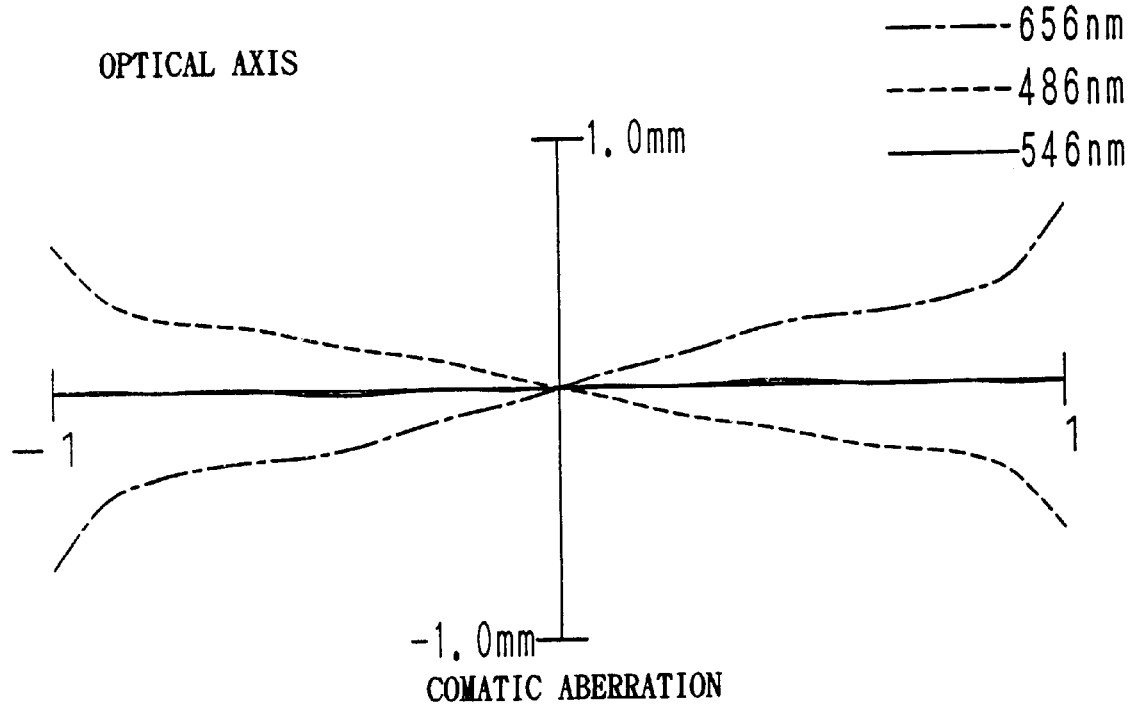
FIGS. 20A and 20B are characteristic diagrams each showing the comatic aberrations with respect to the three types of wavelengths in the projection lens according to the third embodiment.
Figure 20B:
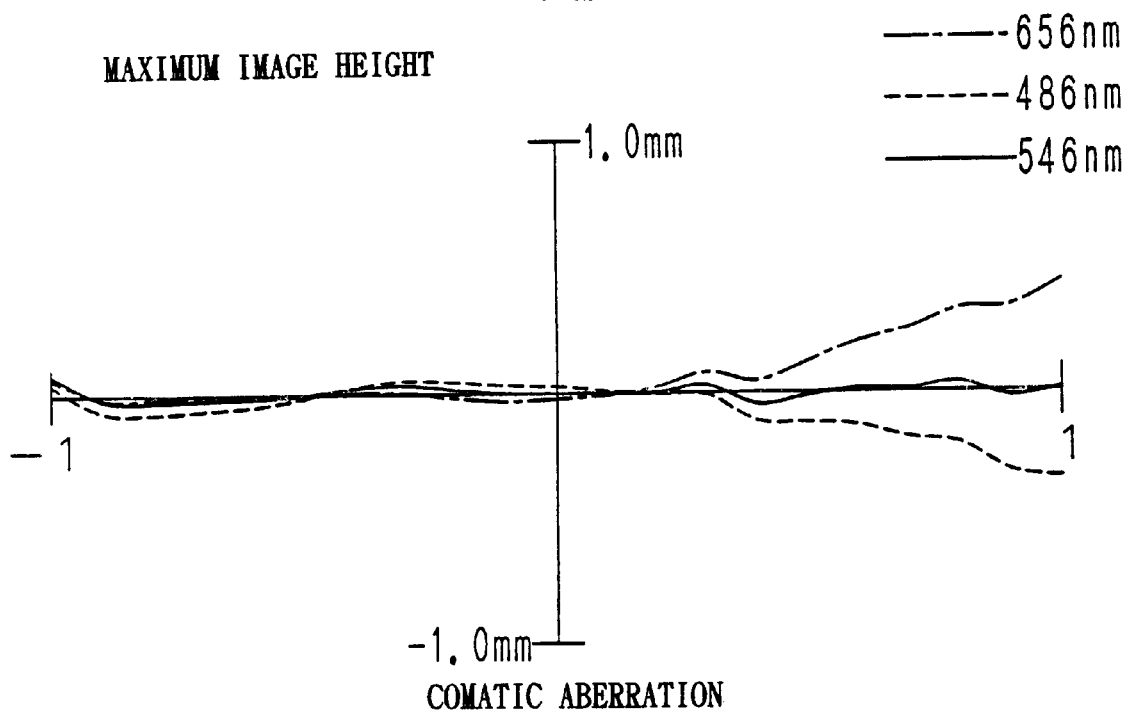

FIG. 20A shows the comatic aberration of the incident light given along the optical axis with respect to three types of wavelengths (i.e. 486 nm, 546 nm and 656 nm) in the projection lens 1C of the third embodiment. FIG. 20B shows the comatic aberration of the incident light given from the maximum image height with respect to the three types of wavelengths (i.e. 486 nm, 546 nm and 656 nm) in the present projection lens 1C of the third embodiment. From comparison of FIGS. 20A and 20B regarding the projection lens 1B with FIGS. 10A and 10B regarding the conventional projection lens, it is known that the projection lens 1C of the third embodiment exhibits smaller color aberrations than the conventional projection lens.

FIG. 21 is a characteristic diagram showing MTF characteristics of the projection lens 1C of the third embodiment. The diagram of FIG. 21 shows that, in the projection lens 1C of the third embodiment, MTF values do not go below approximately 0.6 throughout the entire image height with respect to both the meridional plane and the sagittal plane. From FIG. 21, it is known that the projection lens 1C of the third embodiment exhibits an excellent resolution, i.e., various aberrations including color aberrations are corrected satisfactorily in the projection lens 1C. Further, the comparison between FIGS. 11 and 21 shows that the projection lens 1C of the third embodiment exhibits greatly improved MTF characteristics compared with the conventional projection lens 1.

It should be noted that the projection lens 1C of the third embodiment exhibits a focal length of 75. 83 mm, an F number of 1.00, and a marginal light amount ratio of 31.1%. Thus, each of the values is substantially the same as the corresponding ones obtained in the projection lenses 1A and 1B of the first and second embodiments and conventional projection lenses.

As described above, according to the projection lens of the first embodiment, for the first lens unit, which serves to correct the spherical aberration at the image height of approximately 0.5 to 0.9 and the comatic aberration of the lowermost ray of the off-axis rays, and for the fourth lens unit, which serves to correct the comatic aberration of the uppermost ray of off-axis rays and to correct the back-focus variation caused by temperature change, a lens element made of a polycarbonate resin having a small Abbe number is employed. Also, for the third lens unit, which serves to correct the spherical aberration at the image height of an approximately 1.0, and for the first lens unit of the field curvature correction unit, which correct most of the field curvature, a lens element made of an acrylic resin having a large Abbe number is employed. Further, for the third lens unit which serves as the power lens unit, a glass lens is employed. Owing to this constitution, in the projection lens 1C of the third embodiment, excellent optical characteristics are realized.

The polycarbonate resin has a larger refractive index than the acrylic resin conventionally employed. Owing to this feature, the first lens unit and the fourth lens unit can be made compact, and accordingly the entire projection lens can be made compact.

As described above, the material employed for the first and fourth lens elements of in the third embodiment is polycarbonate resin, and therefore the projection lens of the third embodiment is different from the conventional projection lens in the type of the employed material. However, the projection lens of the third embodiment is the same as the conventional projection lens in that a lens element made of a plastic material is employed. Therefore, reducing the size and weight of the projection lens can be successfully achieved also in the projection lens of the third embodiment.

(D) Fourth Embodiment

Next, a project lens according to a fourth embodiment of the present invention will be described with reference to the attached drawings.

Figure 22:
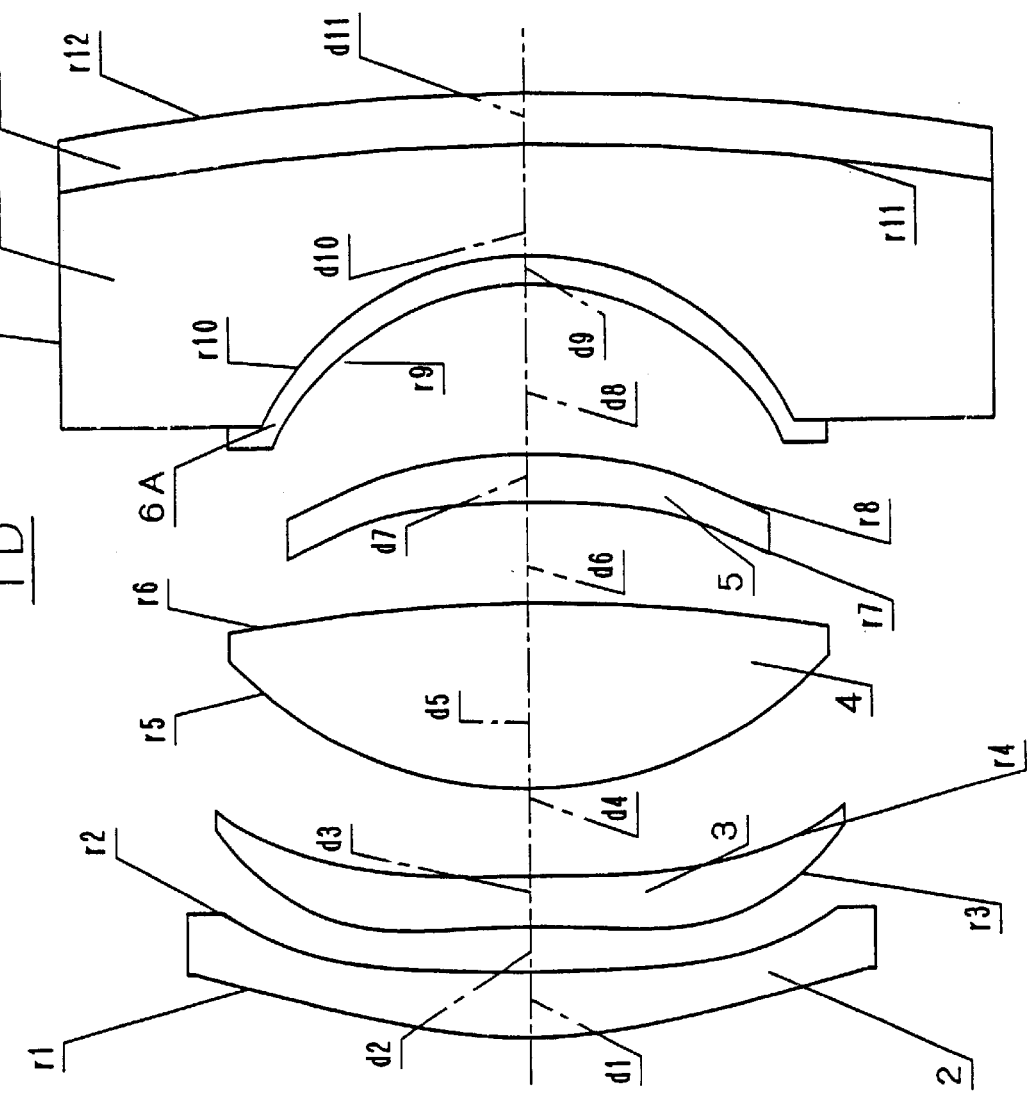
FIG. 22 is a view showing a constitution of a projection lens according to a fourth embodiment of the present invention.

FIG. 22 is a view showing the constitution of a projection lens 1D according to the fourth embodiment of the present invention. In FIG. 12, the same reference numerals or symbols are assigned to the elements or portions identical or corresponding to those in the above-mentioned projection lens 1A according to the first embodiment shown in FIG. 1. FIG. 23 is a table containing the specific values, in the projection lens 1D according to the second embodiment, of: a radius of curvature at the optical axis with respect to each lens surface of the lens elements; a lens thickness and lens gap at the optical axis with respect to each lens element an lens gap; a refractive index (i.e. a refractive index on the d line) with respect to each lens element; and an Abbe number with respect to each lens element. FIG. 24 is a table containing the specific values of the parameters defining the surfaces of lens elements, at least one of the surfaces being aspherical surface.

As is shown in FIG. 22, the projection lens 1D according to the fourth embodiment is also constituted by, from the image end, a first lens unit 2, a second lens unit 3, a third lens unit 4, a fourth lens unit 5, and a fifth lens unit (field curvature correction unit) 6, and the major function of each lens unit is the same as that of the corresponding lens unit in the first embodiment.

Specifically, roughly speaking, the first lens unit serves to correct the spherical aberrations at an image height falling within a range from approximately 0.5 to approximately 0.8 and the comatic aberration of the lowermost ray of off-axis rays; the second lens unit 3 serves to correct the spherical aberration at the image height of approximately 1.0; the third lens unit 4 serves as a power lens unit; the fourth lens unit 5 serves to correct the comatic aberrations of the uppermost ray of the off-axis rays and to correct the back focus caused by temperature change; and the field curvature correction unit 6 serves to correct almost all field curvature caused by the projection lens 1B.

In the projection lens 1D of the fourth embodiment, the materials employed for the respective lens elements are the same as those in the projection lens 1A of the first embodiment. Specifically, also in the projection lens 1D of the fourth embodiment, the second embodiment is the same as the first embodiment in that the Abbe number of the material employed for the first lens unit 2 and the fourth lens unit 5 is much smaller than that of the material employed for the second lens unit 3 and the first lens element 6A of the field curvature correction unit 6, and in the reason why such a difference in the Abbe number is made.

The projection lens 1D of the fourth embodiment is different from the projection lens 1A of the first embodiment in the constitution of the field curvature unit 6. The constitution of the field curvature unit 6 is different chiefly in the following two respects.

First, in the projection lens 1D of the fourth embodiment, unlike the flat boundary surface r11 in the projection lens 1A of the first embodiment, the boundary surface r11 between the second lens 6B and the third lens element 6C of the field curvature correction unit 6 is formed in the shape of a spherical surface, as shown in FIGS. 22 and 23. Here, the boundary surface r11 formed in the spherical surface has a shape substantially the same as that of the surface r12, which serves as a plane of incidence (hereinafter referred to as "incidence plane") in contact with the tube surface of the CRT display device (not shown). Second, in the projection lens 1D of the fourth embodiment, unlike the projection lens 1A of the first embodiment, the boundary surface r10 between the first lens element 6A and the second lens element 6B of the field curvature correction unit 6 is formed in the shape of a spherical surface, as shown in FIG. 24.

The first feature is adopted in view of the following respects. That is, the second lens element 6B of the field curvature correction unit 6 is filled with a cooling liquid. Accordingly, if the third lens element 6C does not have a uniform thickness, a difference in the heat conducted from the CRT display device arises between the region at the optical axis and the regions at the maximum image heights. This may cause convection of the cooling liquid in the second lens element 6B, and such convection may slightly affect the optical characteristics. In order to prevent this undesirable phenomenon, the thickness of the third lens element 6C of the field curvature unit 6 is made uniform by forming the surface r11 into the spherical surface. It should be noted that, the surface r11 is made flat in the first to third embodiments as mentioned above, contrary to the fourth embodiment, that such flat surfaces are advantageous in the manufacturing aspect because a mold for a lens element having a flat surface is easy to manufacture.

The second feature is adopted in view of the manufacturing aspect. Specifically, a mold for a spherical surface is easier to manufacture than that for an aspherical surface, and accordingly the manufacturing cost can be reduced. As a matter of fact, it is more preferable to form the surface r10 into an aspherical surface. However, the surface r10 affects the overall optical characteristics less than the surfaces r1 to r4 and r7 to r9, each of which is also formed in the shape of an aspherical surface in the projection lens 1D. Accordingly, even when the surface r10 is changed to a spherical surface, the projection lens 1D can exhibit substantially the same overall optical characteristics as those of the projection lens 1A of the first embodiment, as will be described later.

As described above, in the projection lens 1D of the fourth embodiment, the respective lens elements perform the same functions as those in the first embodiment. However, the surface r11, which is formed in the shape of a flat surface in the first embodiment, is changed to a spherical surface, and the surface r10, which is formed in the shape of an aspherical surface in the first embodiment, is changed to a spherical surface. As a result, the shape of each lens surface in the fourth embodiment becomes slightly different from that of the corresponding one in the first embodiment.

Figure 25A:
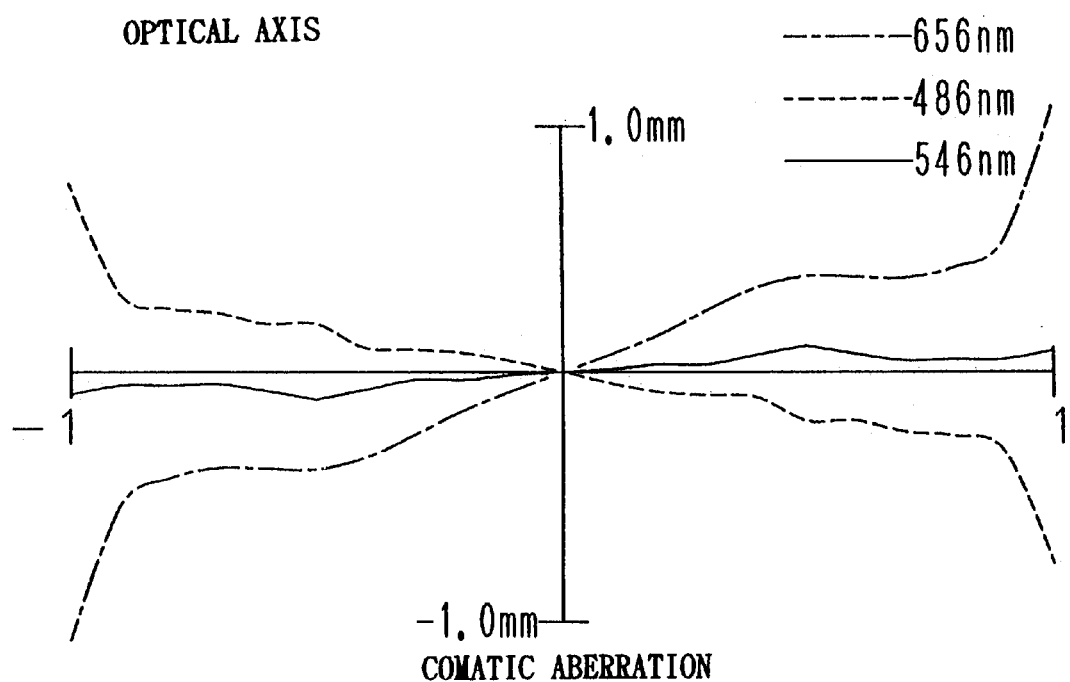
FIGS. 25A and 25B are characteristic diagrams each showing the comatic aberrations with respect to the three types of wavelengths in the projection lens according to the fourth embodiment.
Figure 25B:
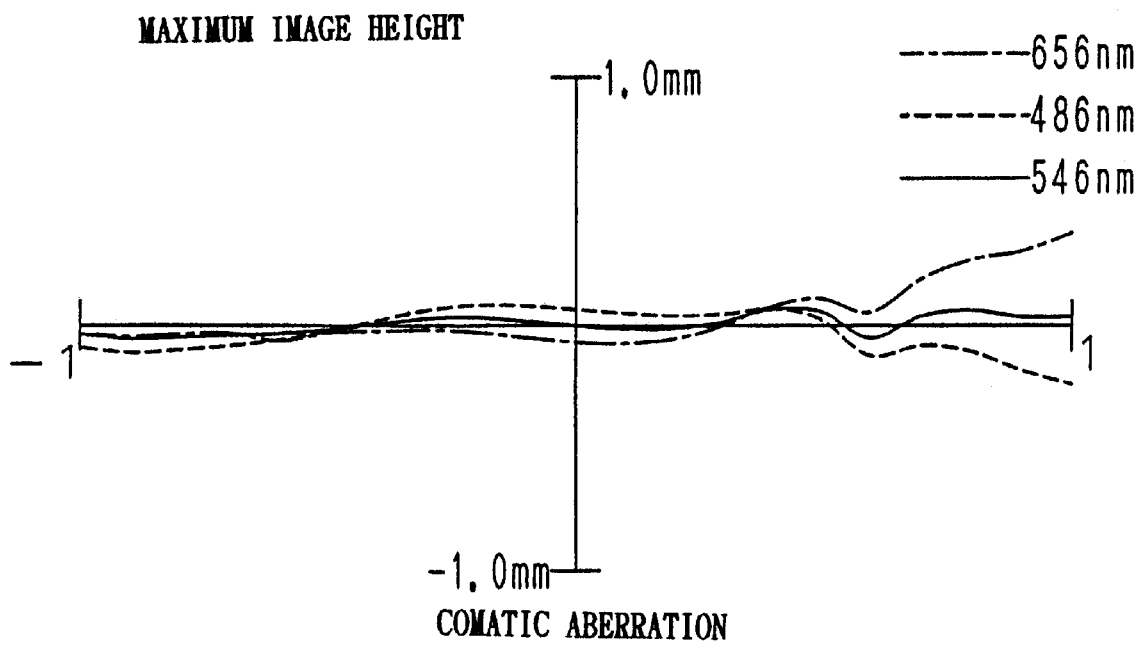

FIG. 25A shows the comatic aberration of the incident light given along the optical axis with respect to three types of wavelengths (i.e. 486 nm, 546 nm and 656 nm) in the projection lens 1D of the fourth embodiment. FIG. 25B shows the comatic aberration of the incident light given from the maximum image height with respect to the three types of wavelengths (i.e. 486 nm, 546 nm and 656 nm) in the projection lens 1B of the second embodiment. From the comparison of FIGS. 25A and 25B regarding the projection lens 1D with FIGS. 10A and 10B regarding the conventional projection lens, it is known that the projection lens 1D of the fourth embodiment exhibits smaller color aberrations than the conventional projection lens 1.

Figure 26:
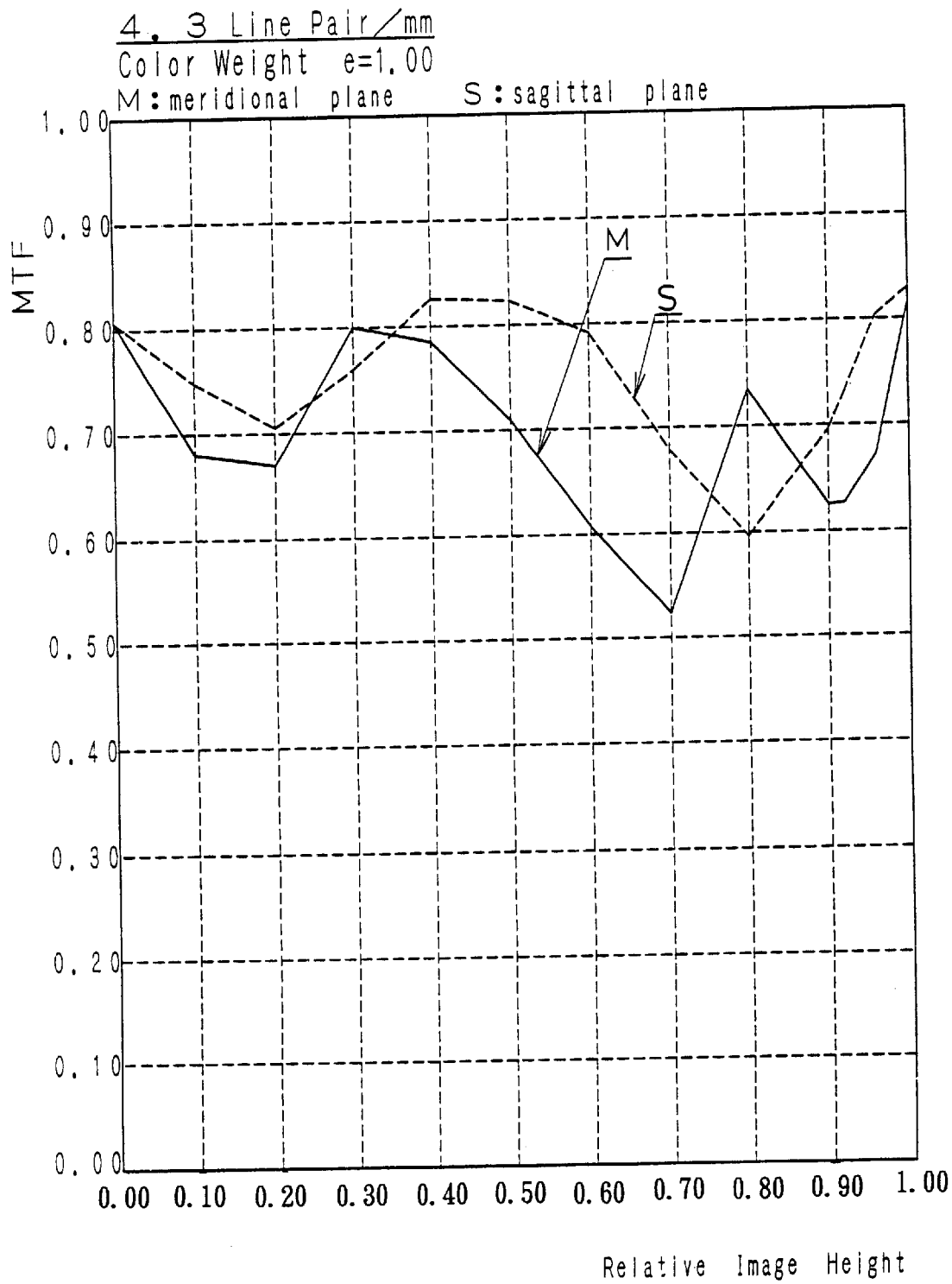
FIG. 26 is a characteristic diagram showing the MTF characteristic in the projection lens according to the fourth embodiment.

FIG. 26 is a characteristic diagram showing MTF characteristics of the projection lens 1C of the fourth embodiment. The diagram in FIG. 26 shows that, in the projection lens 1D of the second embodiment, MTF values do not go below approximately 0.53 throughout the entire image height with respect to both the meridional plane and the sagittal plane. From FIG. 26, it is known that the projection lens 1D of the fourth embodiment exhibits an excellent resolution, i.e., various aberrations including color aberrations are corrected satisfactorily in the projection lens 1D. Further, the comparison between FIGS. 11 and 26 shows that the projection lens 1B of the second embodiment exhibits greatly improved MTF characteristics compared with the conventional projection lens 1.

It should be noted that the projection lens 1D of the second embodiment exhibits a focal length of 80.00 mm, an F number of 1.00, and a marginal light amount ratio of 29.4%. Thus, while the focal length is slightly longer, each of the other values is of substantially the same degree as the corresponding one obtained in the projection lenses 1A, 1B and 1C of the first to third embodiments and conventional projection lenses.

As described above, in the projection lens of the first embodiment, for the second lens unit, which serves to correct the spherical aberration at the image height of approximately 0.5 to 0.8 and the comatic aberration of the lowermost ray of the off-axis rays, and for the fourth lens unit, which serves to correct the comatic aberration of the uppermost ray of off-axis rays and to correct the back-focus variation caused by temperature change, an lens element made of polystyrene resin having a small Abbe number is employed. Also, for the second lens unit, which serves to correct the spherical aberration at the image height of an approximately 1.0, and for the first lens unit of the field curvature correction unit, which correct most of the field curvature, a lens element made of an acrylic resin having a large Abbe number is employed. Further, for the third lens unit which serves as the power lens unit, a glass lens element is employed. Owing to this constitution, in the projection lens 1B of the second embodiment, an excellent optical characteristic can be realized.

The polystyrene resin has a larger refractive index than the acrylic resin conventionally employed. Owing to this feature, the first lens unit and the fourth lens unit can be made compact, and accordingly the entire projection lens can be made compact.

As described above, the material employed for the first and fourth lens elements is optical polyester resin, and therefore the projection lens of the fourth embodiment is different from the conventional projection lens in the type of the employed material. However, the projection lens of the fourth embodiment is the same as the conventional projection lens in that a lens element made of a plastic material is employed. Therefore, reducing the size and weight of the projection lens can be successfully achieved also in the projection lens of the fourth embodiment.

Further, according to the projection lens of the fourth embodiment, since the number of aspherical lens surfaces in the field curvature correction unit 6 is smaller than that in projection lenses of the above-mentioned embodiments, the manufacturing process can be simplified, the manufacturing cost can be reduced, and the difference in the qualities of the products can be made smaller.

Further, according to the projection lens of the fourth embodiment, since the thickness of the third lens element 6C of the field curvature correction unit 6 is made substantially uniform, heat generated by the CRT display device is conducted uniformly across the entire image height (that is, the heat thus conducted is not different regardless of the point in the image where the conducted heat is measured.). Accordingly, the deterioration in the optical characteristics caused by the unevenness in heat conduction can be prevented.

(E) Fifth Embodiment

Next, a projection lens according to a fifth embodiment of the present invention will be described with reference to the attached drawings.

Figure 27:
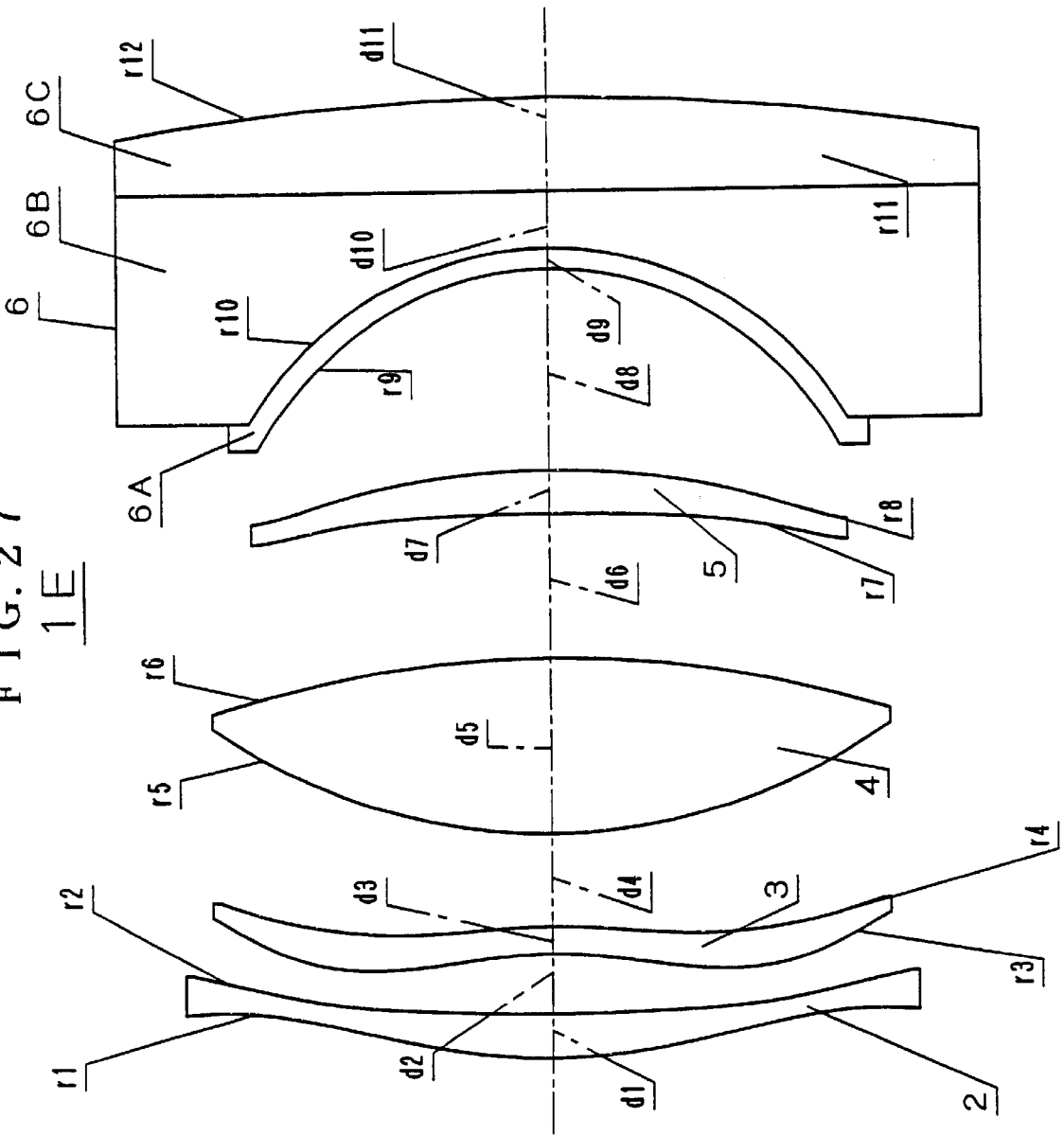
FIG. 27 is a view showing a constitution of a projection lens according to a fifth embodiment of the present invention.

FIG. 27 is a view showing the constitution of a projection lens 1E according to a fifth embodiment of the present invention. In FIG. 27, the same reference numerals or symbols are assigned to the elements or portions identical or corresponding to those in the above-mentioned projection lens 1A according to the first embodiment shown in FIG. 1. FIG. 28 is a table containing the specific values, in the projection lens 1E according to the fifth embodiment, of: a radius of curvature at the optical axis with respect to each lens surface of the lens elements; a lens thickness and lens gap at the optical axis with respect to each lens element and lens gap; a refractive index (i.e. a refractive index on the d line) with respect to each lens element; and an Abbe number with respect to each lens element. FIG. 29 is a table containing the specific values of the parameters defining each of the surfaces of lens elements, at least one of the surfaces being an aspherical surface.

As is shown in FIG. 27, the projection lens 1E according to the fifth embodiment is also constituted by, from the image end, a first lens unit 2, a fifth lens unit 3, a third lens unit 4, a fourth lens unit 5, and a fifth lens unit (field curvature correction unit) 6, and the major function of each lens unit is the same as that of the corresponding lens unit in the first embodiment.

Specifically, roughly speaking, the first lens unit serves to correct the spherical aberration at an image height falling within a range from approximately 0.5 to 0.8 and the comatic aberration of the lowermost ray of off-axis rays; the fifth lens unit 3 serves to correct the spherical aberration at the image height of approximately 1.0; the third lens unit 4 serves as a power lens unit; the fourth lens unit 5 serves to correct the comatic aberrations of the uppermost ray of the off-axis rays and to correct the back focus caused by temperature change; and the field curvature correction unit 6 serves to correct almost all field curvature caused by the projection lens 1E.

Also in the projection lens 1E of the fifth embodiment, the material employed for each lens element is the same as that employed for the corresponding lens element in the projection lens 1A of the above-mentioned first embodiment. Specifically, also in the projection lens 1E of the fifth embodiment, the fifth embodiment is the same as the first embodiment in that the Abbe number of the material employed for the first lens unit 2 and the fourth lens unit 5 is much smaller than that of the material employed for the fifth lens unit 3 and the first lens element 6A of the field curvature correction unit 6, and in that the reason why such difference the Abbe number is made.

A characteristic feature of the projection lens 1E of the fifth embodiment is that a light amount of received light is intended to be increased compared with the projection lenses 1A to 1D of the first to fourth embodiments. In order to realize this feature, the first lens unit 2 to the fourth lens unit 5 is constituted in such a manner that the diameter of the lens unit in the fifth embodiment is made larger than those of the corresponding lens units in the first to fourth embodiments. Also, the first lens element 6A of the field curvature correction unit 6 is constituted in such a manner that the diameter of the lens element in the projection lens 1E of the fifth embodiment is larger than those of the corresponding lens element in the first to fourth embodiments. These differences in the diameters of the fourth lens unit 5 and the first lens element 6A of the field curvature correction unit 6 are known from the comparison between FIG. 27, which shows the constitution of the projection lens 1E of the fifth embodiment, and FIGS. 1, 12, 17 and 22, which show the constitutions of the projection lenses 1A to 1D of the first to fourth embodiments, respectively.

Also in the projection lens 1E of the fifth embodiment, the boundary surface r10 between the first lens element 6A and the fifth lens element 6B of the field curvature correction unit 6 is formed in the shape of a spherical surface, as shown in FIG. 29. In this respect, the projection lens 1E of the fifth embodiment is different from the projection lens 1A of the first embodiment. The reason for this difference is the same as described in the fourth embodiment.

In the projection lens 1E of the fifth embodiment, each lens unit performs the same function as the corresponding one in the first embodiment, as described above. However, since the increase in the light amount is intended, the shape of each lens surface of each lens element in the fifth embodiment is slightly different from the corresponding one in the first embodiment.

Figure 30A:
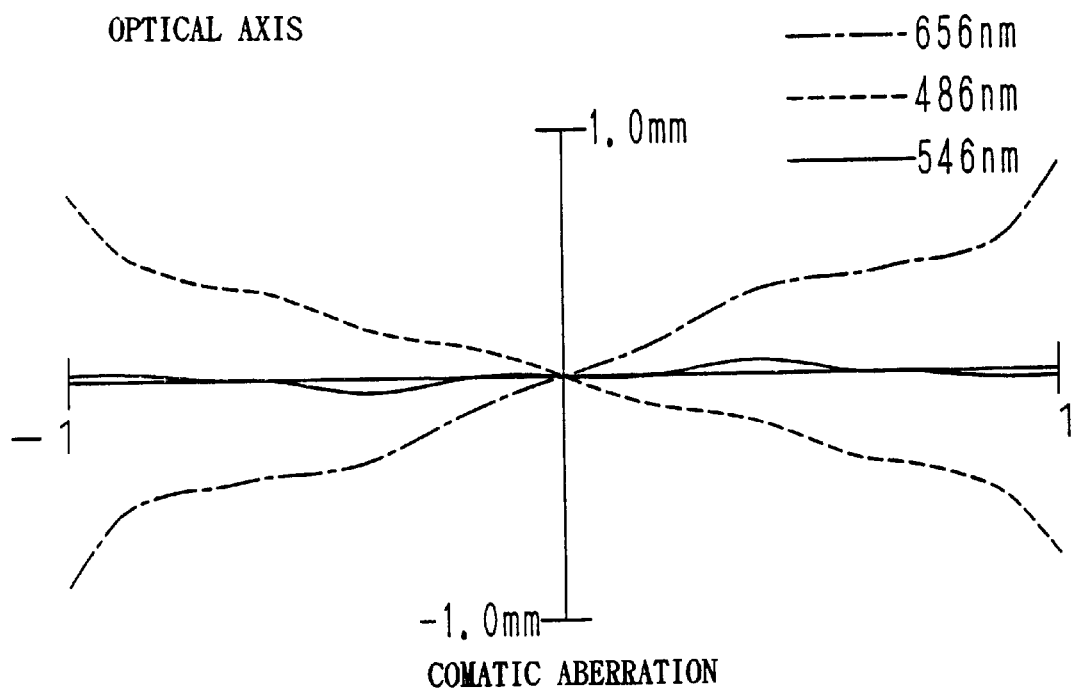
FIGS. 30A and 30B are characteristic diagrams each showing the comatic aberrations with respect to the three types of wavelengths in the projection lens according to the fifth embodiment.
Figure 30B:
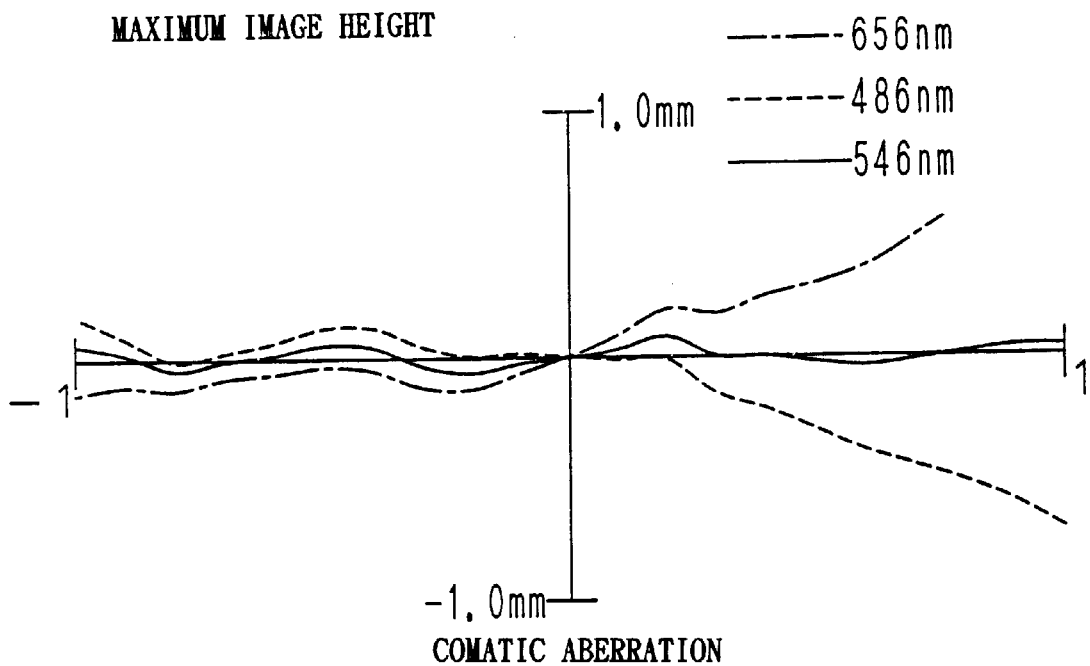

FIG. 30A shows the comatic aberration of the incident light given along the optical axis with respect to three types of wavelengths (i.e. 486 nm, 546 nm and 656 nm) in the projection lens 1E of the fifth embodiment. FIG. 30B shows the comatic aberration of the incident light given from the maximum image height with respect to the three types of wavelengths (i.e. 486 nm, 546 nm and 656 nm) in the projection lens 1E of the fifth embodiment. From comparison of FIGS. 30A and 30B regarding the projection lens 1E with FIGS. 10A and 10B regarding the conventional projection lens, it is known that the projection lens 1E of the fifth embodiment exhibits smaller color aberrations than the conventional projection lens.

Figure 31:
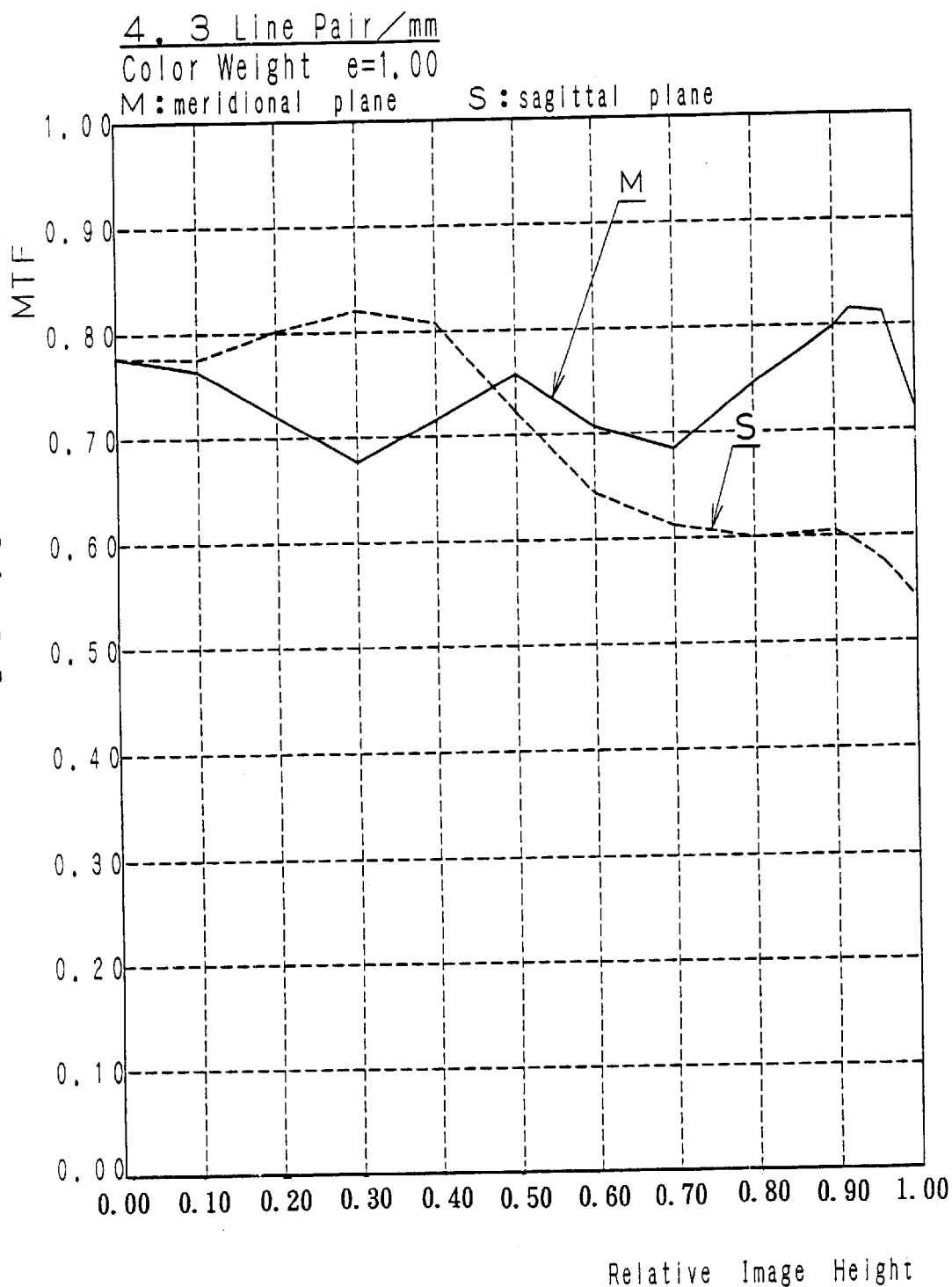
FIG. 31 is a characteristic diagram showing the MTF characteristic in the projection lens according to the fifth embodiment.

FIG. 31 is a characteristic diagram showing MTF characteristics of the projection lens 1C of the fifth embodiment. The diagram in FIG. 31 shows that, in the projection lens 1E of the fifth embodiment, MTF values do not go below approximately 0.55 throughout the entire image height with respect to both the meridional plane and the sagittal plane. From FIG. 31, it is known that the projection lens 1E of the fifth embodiment exhibits an excellent resolution, i.e., various aberrations including color aberrations are corrected satisfactorily in the projection lens 1E. Further, the comparison between FIGS. 11 and 31 shows that the projection lens 1E of the fifth embodiment exhibits greatly improved MTF characteristics compared with the conventional projection lens 1.

It should be noted that the projection lens 1E of the fifth embodiment exhibits a focal length of 88.13 mm, an F number of 0.94, and a marginal light amount ratio of 51.2%. To the contrary, in the projection lenses 1A to 1D of the first to fourth embodiments, the focal length is approximately 75 mm (in the case of the fourth embodiment, 80 mm), F number is approximately 1.00, and the marginal light amount ratio is approximately 30%, as described above. From this comparison, it is known that in the projection lens 1E of the fifth embodiment, the light amount on the screen becomes larger those in the above-mentioned embodiments, as intended.

As described above, according to the projection lens of the fifth embodiment, for the fifth lens unit, which serves to correct the spherical aberration at the image height of approximately 0.5 to 0.8 and the comatic aberration of the lowermost ray of the off-axis rays, and for the fourth lens unit, which serves to correct the comatic aberration of the uppermost ray of off-axis rays and to correct the back-focus variation caused by temperature change, an lens element made of polystyrene resin having a small Abbe number is employed. Also, for the fifth lens unit, which serves to correct the spherical aberration at the image height of an approximately 1.0, and for the first lens unit of the field curvature correction unit, which correct most of the field curvature, a lens element made of an acrylic resin having alarge Abbe number is employed. Further, for the third lens unit which serves as the power lens unit, a glass lens element is employed. Owing to this constitution, in the projection lens 1B of the fifth embodiment, an excellent optical characteristic can be realized.

The optical polyester resin has a larger refractive index than the acrylic resin conventionally employed. Owing to this feature, the first lens unit and the fourth lens unit can be made compact, and accordingly the entire projection lens can be made compact.

As described above, the material employed for the first and fourth lens elements of in the first embodiment is polystyrene resin, and therefore the projection lens of the fifth embodiment is different from the conventional projection lens in the type of the employed material.

However, the projection lens of the fifth embodiment is the same as the conventional projection lens in that a lens element made of a plastic material is employed. Therefore, reducing the size and weight of the projection lens can be successfully achieved also in the projection lens of the fifth embodiment.

Further, according to the projection lens of the fifth embodiment, the light amount on the screen is increased compared with the first to fourth embodiments.

Furthermore, according to the projection lens of the fifth embodiment, since the number of aspherical surfaces out of the plurality of lens surfaces in the image curvature correction unit 6 is reduced compared with the projection lenses of the first to fourth embodiments, the manufacturing process can be simplified, and the manufacturing cost can be reduced, and the difference in the qualities of the products can be made smaller.

(F) Other embodiments

The material of each lens unit is not limited to those in the above-mentioned embodiments.

Figure 32:
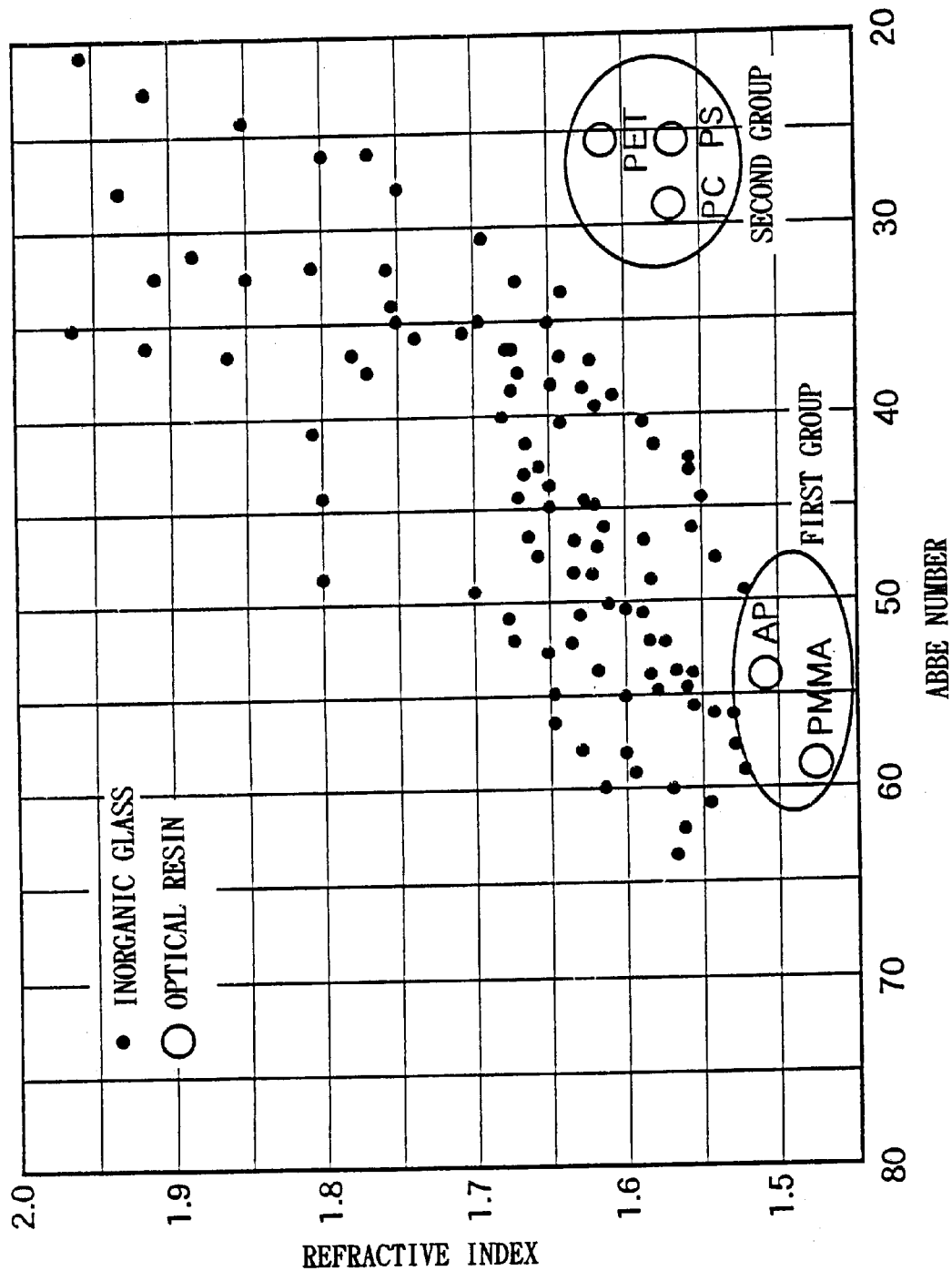
FIG. 32 is an explanatory diagram illustrating the grouping of optical resins in terms of an Abbe number.

Referring to FIG. 32 showing the Abbe number and the refractive index of optical resins, it is known that there are about five to six types of optical resins applicable to plastic lenses under the existing circumstances. Such optical resins can be grouped into two groups: a first group including PMMA and polyolefin resin (AP), each having an Abbe number of 50 to 60; and a second group including PC, PS and polyester resin (PET), each having an Abbe number of 20 to 35, as shown in FIG. 32.

Under the circumstances, in the case where, for the third lens unit 6 serving as a power lens unit, a most common optical glass having an Abbe number falling within the range 50 to 75 is employed, for the first lens unit 2 and the fourth lens unit 5, plastic lens elements belonging to the second group can be employed, while for the second lens unit 3 and the first lens element 6A of the field curvature correction unit 6, plastic lens elements belonging to the first group can be employed. Thus, the specific glass materials and resin materials are not limited to those employed in the above-mentioned embodiments. Further, the first lens unit 2 and the fourth lens unit 5 may be constituted by the other materials than those employed in the above-mentioned embodiments so long as the materials belongs to the second group.

In the above-mentioned embodiments, each of the first, second and fourth lens units is constituted bya single lens element, but may be constituted by a group lens which consists of a plurality of lens elements and performs its desired correcting function. For example, the fourth lens unit may be constituted by two lens elements.

Although, in the above-mentioned embodiments, the present invention is applied to the projection lens having the five-lens-unit structure, it is not limited thereto. For example, the present invention can be also applied to a projection lens having a four-lens-unit structure, a six-lens-unit structure, or a seven-lens-unit structure. In other words, the present invention can be applied to a projection lens which is of the type that two or more plastic lens elements are provided on the image side with respect to the power lens made of glass (note that the number of lens units may be one) and two or more plastic lens elements are provided on the opposite-image side with respect to the power lens, and which satisfies a condition that both on the image side and on the opposite-image side, there are provided both plastic lens elements belonging to the first group and plastic lens elements belonging to the second group, so that, while keeping the aberration functions of the respective lens units, the color aberration is also reduced to a small value.

Further, in each of the above-mentioned embodiments, the present invention is intended to be applied to a projector lens for use in a projector for a high-vision television set which requires a high resolution. However, not to mention, the present invention can be applied to a projection lens for use in a projector for an ordinary television set.

(G) Advantages of the Invention

As described above, according to the present invention, the power lens unit includes a lens element made of a glass material having an Abbe number falling within a range from 50 to 75; the one or more image-side lens units include a lens element made of a plastic material having an Abbe number falling within a range from 20 to 35, and a lens element made of a plastic material having an Abbe number falling within a range from 50 to 60; and the one or more opposite-image-side lens units include a lens element made of a plastic material having an Abbe number falling within a range from 20 to 35, and a lens element made of a plastic material having an Abbe number falling within a range from 50 to 60. Owing to this constitution, the optical characteristics, such as a color aberration, can be enhanced more than conventional projection lenses.

It should be noted that, since the present invention is not limited to the above-described embodiments and modifications, and that the scope of the invention is to be determined solely by the appended claims.

What is claimed is:

1. A projection lens comprising: a power lens unit; one or more image-side lens units, provided on the image side with respect to the power lens, for correcting an aberration; and one or more opposite-image-side lens units, provided on the side opposite to the image side with respect to the power lens, for correcting an aberration, wherein the power lens unit includes a lens element made of a glass material having an Abbe number falling within a range from 50 to 75, the one or more image-side lens units include a lens element made of a plastic material having an Abbe number falling within a range from 20 to 35, and a lens element made of a plastic material having an Abbe number falling within a range from 50 to 60, and the one or more opposite-image-side lens units include a lens element made of a plastic material having an Abbe number falling within a range from 20 to 35, and a lens element made of a plastic material having an Abbe number falling within a range from 50 to 60.

2. The projection lens according to claim 1, comprising, from the image end, a first lens unit serving to correct a spherical aberration at a middle image height and a comatic aberration of the lowermost ray of off-axis rays, a second lens unit serving to correct a spherical aberration adjacent to a maximum image height, a third lens unit serving as a power lens unit, a fourth lens unit serving to correct a comatic aberration of the uppermost ray of off-axis rays and back focus variation caused by temperature change, and a fifth lens unit serving to correct curvature of field, wherein the third lens unit includes a lens element made of a glass material having an Abbe number falling within a range from 50 to 75, each of the first and fourth lens units includes a lens element made of a plastic material having an Abbe number falling within a range from 20 to 35, and each of the second and fifth lens units includes a plastic lens element made of a plastic material having an Abbe number falling within a range from 50 to 60.

3. The projection lens according to claim 2, wherein the lens element made of a plastic material in each of the first and fourth lens units is a lens element made of a polyester resin.

4. The projection lens according to claim 2, wherein each of the plastic lens elements in the second and fifth lens units is a lens element made of an acrylic resin.

5. The projection lens according to claim 3, wherein each of the plastic lens elements in the second and fifth lens units is a lens element made of an acrylic resin.

* * * * *

UNITED STATES PATENT AND TRADEMARK OFFICE
CERTIFICATE OF CORRECTION

PATENT NO. : 6,144,499
DATED : November 7, 2000
INVENTOR(S) : Yokota et al.

It is certified that error appears in the above-identified patent and that said Letters Patent is hereby corrected as shown below:

Column 5,
In formula 2, "$Y^{2+Z2}$" should read -- $Y^2 + Z^2$ --.

Column 6,
Line 34, do not begin a new paragraph with "This".

Column 19,
Line 2, "alarge" should read -- a large --;
Line 16, do not begin a new paragraph with "However,"; and
Line 57, "bya" should read -- by a --.

Signed and Sealed this

Twenty-seventh Day of November, 2001

*Attest:*

*Attesting Officer*

NICHOLAS P. GODICI
*Acting Director of the United States Patent and Trademark Office*